United States Patent
Benjebbour et al.

(10) Patent No.: US 10,536,203 B2
(45) Date of Patent: Jan. 14, 2020

(54) RADIO BASE STATION, USER TERMINAL, RADIO COMMUNICATION METHOD AND RADIO COMMUNICATION SYSTEM

(71) Applicant: NTT DOCOMO, INC., Tokyo (JP)

(72) Inventors: Anass Benjebbour, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/655,503

(22) PCT Filed: Dec. 25, 2013

(86) PCT No.: PCT/JP2013/084709
§ 371 (c)(1),
(2) Date: Jun. 25, 2015

(87) PCT Pub. No.: WO2014/104114
PCT Pub. Date: Jul. 3, 2014

(65) Prior Publication Data
US 2015/0358064 A1 Dec. 10, 2015

(30) Foreign Application Priority Data
Dec. 28, 2012 (JP) .................................. 2012-288166

(51) Int. Cl.
*H04B 7/06* (2006.01)
*H04W 72/12* (2009.01)
*H04B 7/0452* (2017.01)
*H04B 7/0456* (2017.01)
*H04W 16/28* (2009.01)

(52) U.S. Cl.
CPC ......... *H04B 7/0626* (2013.01); *H04B 7/0452* (2013.01); *H04B 7/0456* (2013.01);
(Continued)

(58) Field of Classification Search
CPC .................................................. H04B 7/0626
See application file for complete search history.

(56) References Cited

U.S. PATENT DOCUMENTS 8,447,339 B2    5/2013   Wu et al.
2003/0198201 A1*  10/2003   Ylitalo .................. H04B 7/005
                                                370/329
(Continued)

FOREIGN PATENT DOCUMENTS

EP         2 239 866 A1    10/2010

OTHER PUBLICATIONS

Office Action issued in the counterpart Japanese Patent Application No. 2012-288166, dated Sep. 6, 2016 (5 pages).
(Continued)

*Primary Examiner* — John D Blanton
(74) *Attorney, Agent, or Firm* — Osha Liang LLP

(57) ABSTRACT

The present invention is designed to provide a radio base station, a user terminal, a radio communication method and a radio communication system of novel structures that can achieve improved throughput and system capacity. A radio base station transmits downlink reference signals that are specific to a plurality of transmission beams, a plurality of user terminals feed back coarse channel state information that is acquired by channel estimation, to the radio base station, the radio base station selects a plurality of user terminals to make feed back accurate channel state information based on the coarse channel state information, a plurality of user terminals that are selected feed back accurate channel state information, the radio base station determines a plurality of user terminals to non-orthogonal-multiplex, per transmission beam, based on the accurate channel state information, and non-orthogonal-multiplexes downlink signals, and a plurality of user terminals that are determined, after having canceled interference between the transmission beams by means of a linear filter, cancels downlink signals for other terminals, from the downlink signals that are non-orthogonal-multiplexed in each transmission beam.

15 Claims, 16 Drawing Sheets

(52) U.S. Cl.
CPC ........... *H04B 7/065* (2013.01); *H04B 7/0617* (2013.01); *H04B 7/0619* (2013.01); *H04W 72/1289* (2013.01); *H04W 16/28* (2013.01)

(56) References Cited

U.S. PATENT DOCUMENTS

| | | | | |
|---|---|---|---|---|
| 2010/0246711 | A1* | 9/2010 | Kishigami | H04L 5/0039 375/295 |
| 2011/0188393 | A1 | 8/2011 | Mallik et al. | |
| 2012/0155423 | A1* | 6/2012 | Kishiyama | H04B 7/0678 370/330 |
| 2013/0114434 | A1* | 5/2013 | Muruganathan | H04W 16/14 370/252 |
| 2014/0226508 | A1* | 8/2014 | Asplund | H04L 1/002 370/252 |

OTHER PUBLICATIONS

International Search Report issued in corresponding PCT Application No. PCT/JP2013/084709 dated Jan. 28, 2014 (2 pages).

Ken'ichi Higuichi et al.; "Non-orthogonal Access with Random Beamforming and Intra-beam SIC for Cellular MIMO Downlink"; IEICE Technical Report RCS, vol. 112, No. 132; pp. 85-90; Jul. 2012 (6 pages).

Shun Tomida et al; "Non-orthogonal Access with SIC in Cellular Downlink for User Fairness Enhancement"; Intelligent Signal Processing and Communications Systems (ISPACS), 2011 International Symposium; pp. 1-6; Dec. 2011 (6 pages).

3GPP TR25.913 V8.0.0; "3rd Generation Partnership Project; Technical Specification Group Radio Access Network; Requirements for Evolved UTRA (E-UTRA) and Evolved UTRAN (E-UTRAN) (Release 8)" Dec. 2008 (18 pages).

Office Action issued in corresponding Chinese Application No. 201380067999.5, dated Jun. 2, 2017 (22 pages).

Office Action issued in the counterpart Japanese Patent Application No. 2017-132596, dated May 8, 2018 (6 pages).

Yoshihisa Kishiyama, et al.; "Initial Views on Non-orthogonal Multiple Access Based Radio Interface for Future Radio Access"; IECE Technical Report, pp. 37-42, Jul. 14, 2011 (6 pages).

Juergen Otterbach, et al.; "Power Control Scheme Supporting Non-Orthogonal Superposition"; IEEE C802.16m-08/815, Jul. 7, 2008 (3 pages).

* cited by examiner

OPPORTUNISTIC BEAMFORMING
WITH REDUCED CSI FEEDBACK

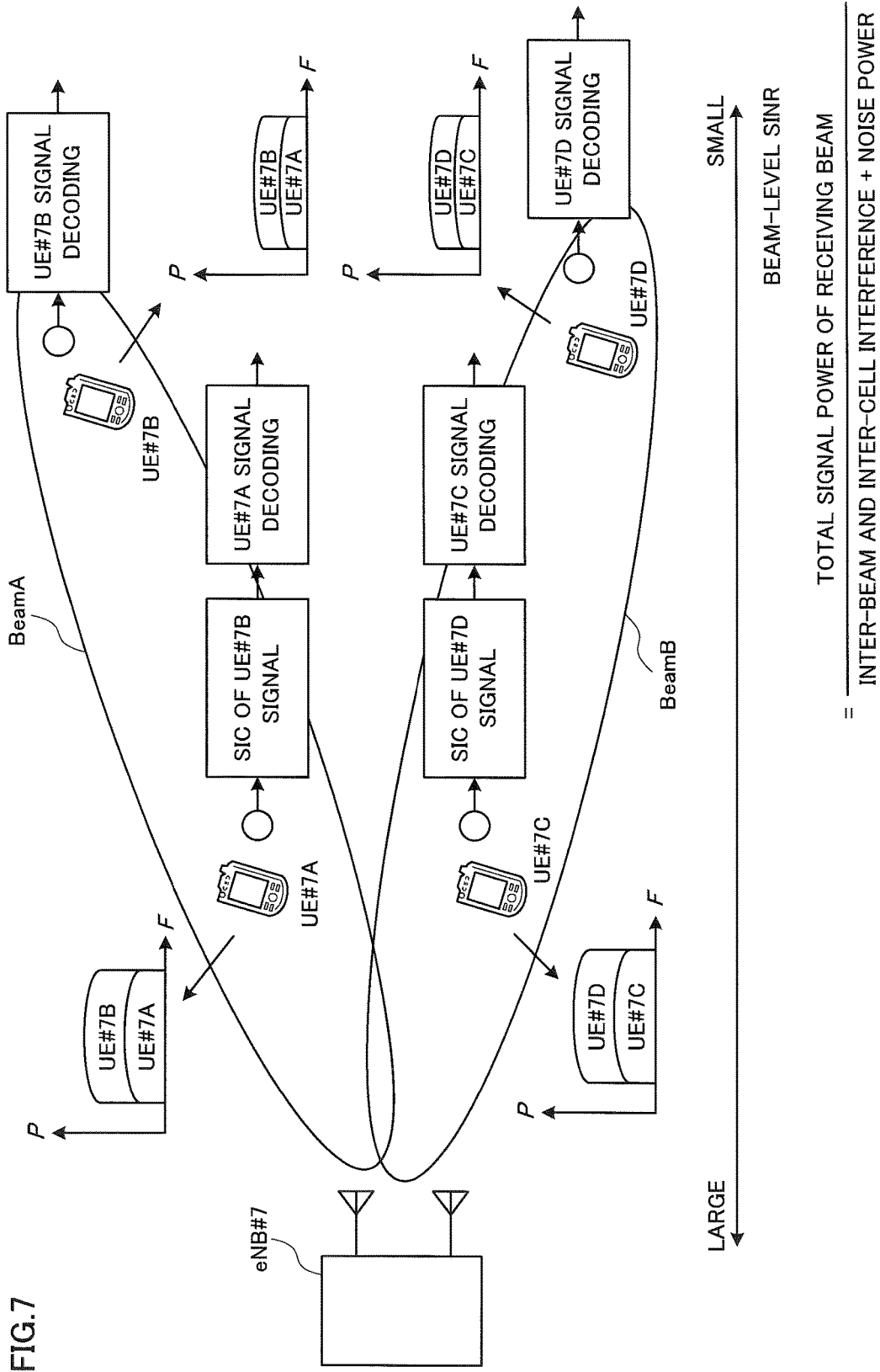

RADIO BASE STATION, USER TERMINAL, RADIO COMMUNICATION METHOD AND RADIO COMMUNICATION SYSTEM

TECHNICAL FIELD

The present invention relates to a radio base station, a user terminal, a radio communication method and a radio communication system.

BACKGROUND ART

The specifications of long-term evolution (LTE) have been developed for the purpose of achieving increased speed, lower delay and so on in UMTS (Universal Mobile Telecommunications System) (non-patent literature 1). In LTE, a communication scheme that is based on OFDMA (Orthogonal Frequency Division Multiple Access) is used in downlink channels (downlink), and a communication scheme that is based on SC-FDMA (Single Carrier Frequency Division Multiple Access) is used in uplink channels (uplink).

In LTE, MIMO (Multiple Input Multiple Output) transmission to transmit different information data sequences in parallel from a plurality of transmitting antennas by using the same radio resources (frequency band, time slots, etc.) is employed. In this MIMO transmission, a plurality of information data sequences are transmitted via varying routes using the same radio resources, so that it is possible to achieve high throughput and system capacity by space division multiplexing.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

The throughput and system capacity that are achieved by above MIMO transmission depend on the number of information data sequences to be transmitted in parallel. Consequently, if the number of information data sequences to be transmitted in parallel is increased by, for example, increasing the number of antennas pertaining to transmission/reception, it is possible to improve the throughput and system capacity. However, with this method, the system structure becomes more complex as the number of antennas increases, and therefore the throughput and system capacity that can be achieved are limited.

The present invention has been made in view of the above, and it is therefore an object of the present invention to provide a radio base station, a user terminal, a radio communication method and a radio communication system of novel structures that can achieve improved throughput and system capacity.

Solution to Problem

The radio base station of the present invention has a beam generating section that generates a plurality of transmission beams, a downlink reference signal generating section that generates downlink reference signals that are specific to each transmission beam, a downlink control information generating section that first generates downlink control information to request a feedback of coarse channel state information to a user terminal, and next generates downlink control information to request a feedback of accurate channel state information, a scheduling section that selects a plurality of user terminals to make feed back the accurate channel state information based on the coarse channel state information that is fed back, and determines a plurality of user terminals to non-orthogonal-multiplex, per transmission beam, based on the accurate channel state information that is fed back, and a downlink channel multiplexing section that non-orthogonal-multiplexes downlink signals for the plurality of user terminals that are determined, in each of the plurality of transmission beams, in accordance with results determined in the scheduling section.

Technical Advantage of the Invention

According to the present invention, it is possible to provide a radio base station, a user terminal, a radio communication method and a radio communication system of novel structures that can achieve improved throughput and system capacity.

BRIEF DESCRIPTION OF THE DRAWINGS

FIG. 7 is a schematic diagram to explain how downlink signals that are transmitted by non-orthogonal multiplexing are received in each user terminal;

DESCRIPTION OF EMBODIMENTS

Figure 1:
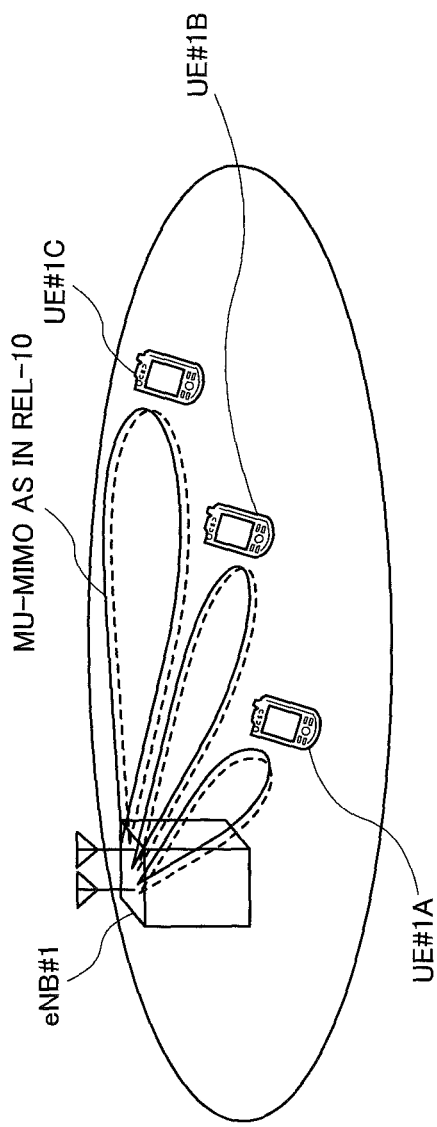
FIG. 1 is a schematic diagram to show an example basic structure of a radio communication system where MIMO transmission is employed.

FIG. 1 is a schematic diagram to show an example basic structure of a radio communication system where MIMO (Multiple Input Multiple Output) transmission is employed. The radio communication system shown in FIG. 1 has radio base station eNB #1 (eNB: eNodeB) with a plurality of transmitting antennas. In the coverage area of radio base station eNB #1, a plurality of user terminals UE #1 (UE: User Equipment) (here, user terminals UE #1A, UE #1B and UE #1C) are present.

In this radio communication system, different data sequences are transmitted from a plurality of antennas of radio base station eNB #1 to a plurality of user terminals UE #1 in parallel. That is, a plurality of information data sequences are transmitted by using the same radio resources, in different routes. Examples of MIMO transmission include single-user MIMO (SU-MIMO) transmission to transmit a plurality of information data sequence to a single user terminal UE #1 in parallel, and multiple-user MIMO (MU-MIMO) transmission to transmit a plurality of information data sequences to different user terminals UE #1 in parallel. FIG. 1 shows a case where multiple-user MIMO transmission is employed.

The throughput and system capacity of a radio communication system employing MIMO transmission depend on the number of information data sequences that are transmitted in parallel. That is, if the number of information data sequences to be transmitted in parallel is increased by, for example, increasing the number of antennas in radio base station eNB #1 and user terminal UE #1, it is possible to improve the throughput and system capacity of the radio communication system. However, if the number of information data sequences to be transmitted in parallel is increased, the system structure that is required for transmission/reception becomes complex, and, in the future, it becomes necessary to improve throughput and system capacity in a different approach from the space division multiplexing (space dimension multiplexing) of above MIMO transmission.

For example, it is possible to improve the throughput and system capacity of a radio communication system even more by employing non-orthogonal access, whereby downlink transmission power (transmission power) is changed per user terminal UE #1 (and which is also referred to as "non-orthogonal multiplexing," "power division multiplexing," "power dimension multiplexing" and so on). So, a study has been conducted on NOMA (Non-Orthogonal Multiple Access), which is non-orthogonal access premised upon canceling interference on the receiving side.

Figure 2:
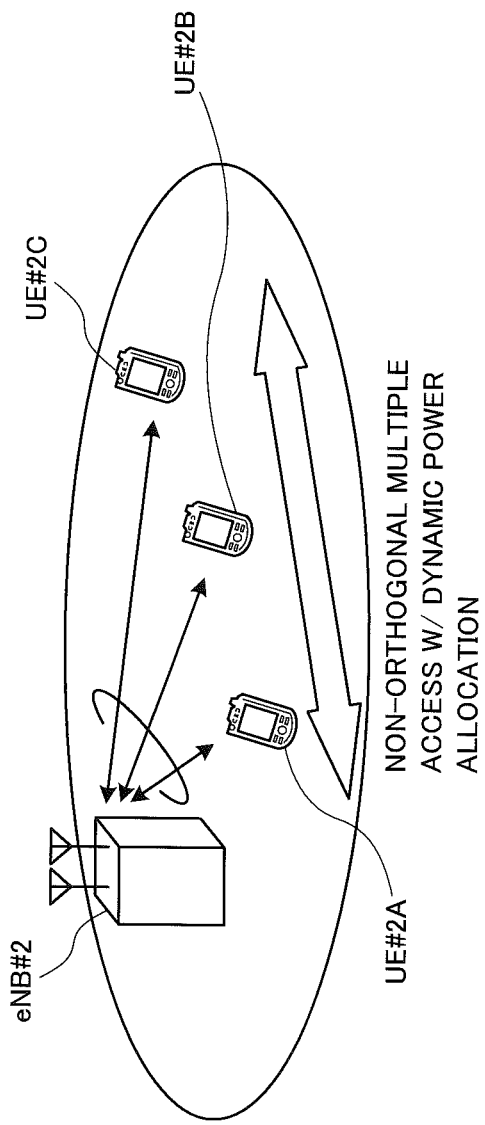
FIG. 2 is a schematic diagram to show an example basic structure of a radio communication system where NOMA is employed.

FIG. 2 is a schematic diagram to show an example basic structure of a radio communication system employing NOMA. FIG. 2 shows an example in which radio base station eNB #2 forms a cell. In the coverage area of radio base station eNB #2, a plurality of user terminals UE #2 (here, user terminals UE #2A, UE #2B and UE #2C) are placed. In this radio communication system, downlink data signals are transmitted with different transmission power from the transmitting antennas of radio base station eNB #2 to a plurality of user terminals UE #2.

In the radio communication system shown in FIG. 2, transmission power is controlled in accordance with, for example, the received SINR of user terminal UE #2, the path loss (propagation loss and route loss) between radio base station eNB #2 and user terminal UE #2, and so on. To be more specific, control is executed so that low transmission power is allocated to user terminal UE #2A where the received SINR is high (the path loss is insignificant), and high transmission power is allocated to user terminal UE #2C where the received SINR is low (the path loss is significant).

When transmission power is allocated in such a manner, signals for user terminals UE #2A and UE #2B become sufficiently weak in the location where user terminal UE #2C serves. Consequently, user terminal UE #2C can decode the signal for user terminal UE #2C assuming that there is little interference from the signals for user terminals UE #2A and UE #2B. Signals for user terminals UE #2B and UE #2C are strong in the location where user terminal UE #2A serves. Consequently, user terminal UE #2A receives the signals for user terminals UE #2B and UE #2C, in addition to the signal for user terminal UE #2A.

In NOMA, signals for each user terminal UE #2 are multiplexed in an identifiable manner. User terminal UE #2A decodes the signals for user terminals UE #2B and UE #2C by means of SIC (Successive Interference Cancellation), and separates the signal for user terminal UE #2A. By applying this NOMA and multiplexing (non-orthogonal-multiplexing) signals for a plurality of user terminals UE #2 over the same radio resources (frequency band, time slots, etc.) with different transmission power, it may be possible to improve the throughput and system capacity even more.

Now, the affinity between SIC used in NOMA, and MIMO transmission will be considered. For example, assume that, in the system structure shown in FIG. 1, $h_1 = [100\ 99]$ is the channel matrix to represent the channel state between radio base station eNB #1 and user terminal UE #1A and $h_2 = [1\ -1]$ is the channel matrix to represent the channel state between radio base station eNB #1 and user terminal UE #1B. When precoding is carried out using a precoder $m_2 = [1\ -1]^T$, $h_1 \square m_2 = 1 < h_2 \square m_2 = 2$ holds, so that the received signal intensity in user terminal UE #1A becomes lower than the received signal intensity in user terminal UE #1B. When precoding is carried out using a precoder $m_2 = [1\ 1]^T$, $h_1 \square m_2 = 199 > h_2 \square m_2 = 0$ holds, so that the received signal intensity in user terminal UE #1A becomes greater than the received signal intensity in user terminal UE #1B.

In this way, in MIMO transmission, the signal intensity as received in user terminals UE #1 varies depending on the precoder that is applied, so that it is not possible to uniquely determine whether the channel state is good or poor. Consequently, there is a possibility that, with transmission power control alone, signals for other user terminals UE #1, which cause interference, cannot be decoded or cancelled. That is, in MIMO transmission, a downlink communication channel cannot be handled as a degraded BC (Broadcast Channel), and therefore it is not possible to uniquely determine whether the channel state is good or poor, and this makes it difficult to apply above-noted SIC.

The above problem can be solved by employing precoding (for example, THP (Tomlinson Harashima Precoding)) by means of DPC (Dirty Paper Coding). However, in that case, the system structure becomes complex. Also, precoding by means of DPC is sensitive to the quality of channel state information (CSI) that is provided as feedback, and therefore there is also a problem that the quality of communication is even more likely to lower due to the influence of the decrease of the accuracy of channel estimation, feedback errors, and so on.

Given these problems, the present inventors have thought that it may be possible to achieve improved throughput and system capacity, by applying non-orthogonal multiplexing (NOMA) to system structures in which a downlink communication channel can be handled as a degraded BC, in MIMO transmission to use a plurality of transmitting/receiving antennas, without making the structure complex. As for the system structures in which a downlink communication channel can be handled as a degraded BC, for example, a system structure to employ opportunistic beamforming is possible. Note that opportunistic beamforming may be referred to as "random beamforming" as well.

Figure 3A:
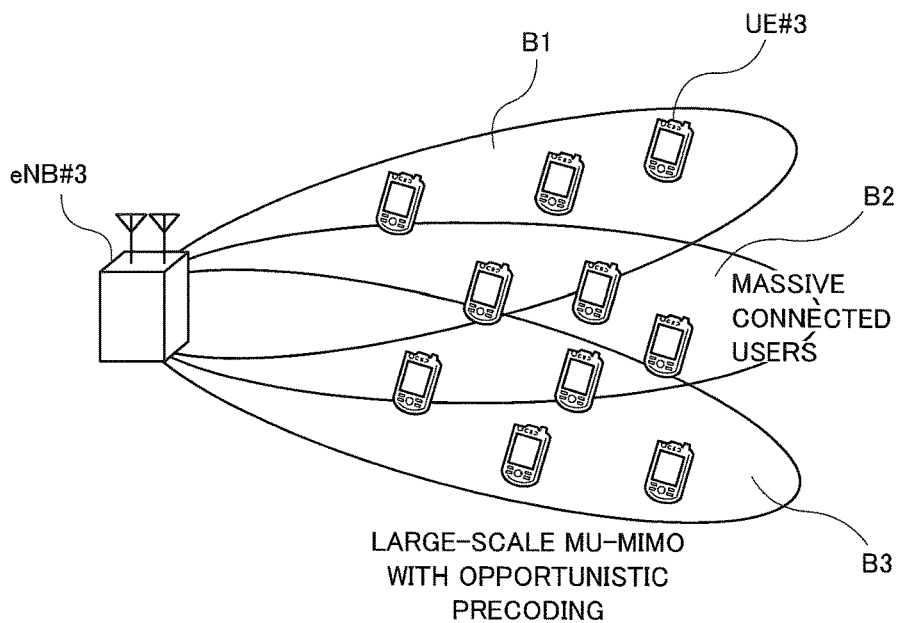
FIGS. 3A and 3B provide schematic diagrams to show an example structure of a radio communication system where opportunistic beamforming is employed.
Figure 3B:
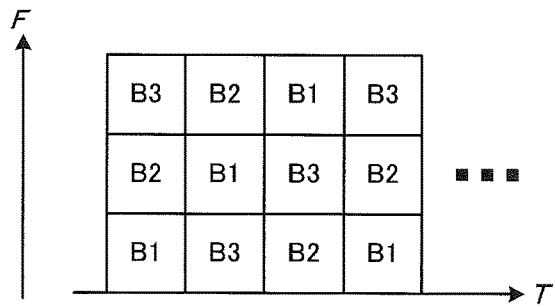

FIG. 3 provides schematic diagrams to show an example structure of a radio communication system where opportunistic beamforming is employed. The radio communication system shown in FIG. 3A has radio base station eNB #3 that generates transmission beams B1, B2 and B3 of predetermined patterns or random patterns. A plurality of transmission beams B1, B2 and B3 that are generated in radio base station eNB #3 are, for example, made orthogonal to each other. However, since the interference between the transmission beams can be canceled by an IRC (Interference Rejection Combining) receiver of a linear filter and/or the like on the receiving side, it is not necessary to make these transmission beams completely orthogonal to each other. In this opportunistic beamforming, as shown in FIG. 3B, the transmission beams B1, B2 and B3 are generated by using radio resources (frequency band, time slots. etc.) of predetermined patterns or random patterns. Note that, in opportunistic beamforming, a plurality of transmission beams have only to be generated using radio resources of predetermined patterns, so that the number of transmission beams generated at a given time (time slot) may be one.

A plurality of user terminals UE #3 are placed in each of the coverage areas of transmission beams B1, B2 and B3. Each user terminal UE #3 performs channel estimation based on beam-specific downlink reference signals transmitted in each transmission beam B1, B2 and B3, and feeds back channel quality information (CQI: Channel Quality Indicator) to radio base station eNB #3. Radio base station eNB #3 transmits downlink data by selecting user terminal UE #3 of the highest CQI among transmission beams B1, B2 and B3.

Figure 4:
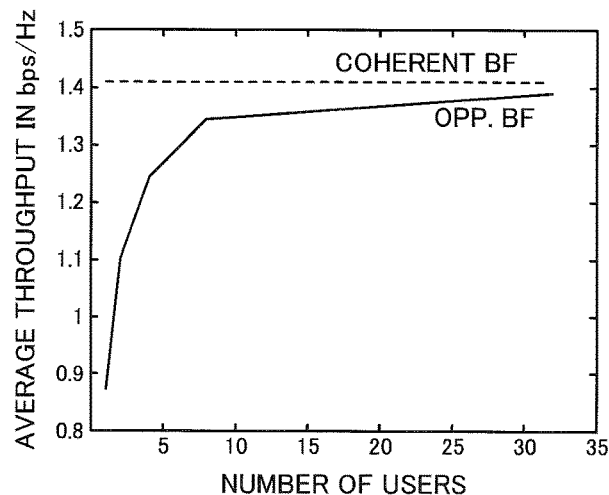
FIG. 4 is a graph to show the relationship between the number of user terminals and average throughput.

FIG. 4 is a graph to show the relationship between the number of user terminals and average throughput. In opportunistic beamforming (Opp. BF: Opportunistic BeamForming), as noted earlier, downlink data is transmitted by selecting user terminal UE #3 of the highest CQI in the coverage areas of transmission beams B1, B2 and B3, which are generated in arbitrary patterns. If the number of user terminals UE #3 in each coverage area increases, the possibility that user terminal UE #3 of good channel quality are present also increases, so that, as shown in FIG. 4, it is possible achieve high throughput that is as good as that of above-described MIMO transmission (Coherent BF: Coherent BeamForming).

In this opportunistic beamforming, for example, it is possible to handle a communication channel as a degraded BC by canceling the interference among transmission beams B1, B2 and B3 by means of a linear filter. Consequently, the affinity with SIC is high, and it is possible to cancel interference adequately even when non-orthogonal multiplexing is employed. So, with the present invention, non-orthogonal multiplexing is applied to this opportunistic beamforming. Now, examples of the present invention will be described below.

First Example

A first example of a radio communication scheme, which applies non-orthogonal multiplexing (NOMA) to opportunistic beamforming, will be described. FIG. 5 provides schematic diagrams to explain the radio communication scheme according to the first example.

Figure 5A:
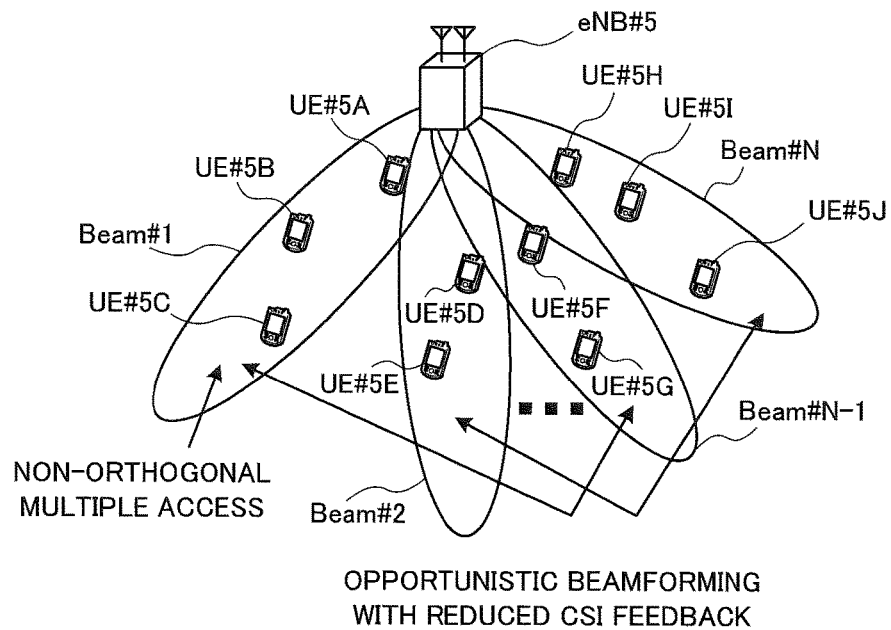
FIGS. 5A and 5B provide schematic diagrams to explain a radio communication scheme according to a first example.

The radio communication system shown in FIG. 5A has radio base station eNB #5, which generates N transmission beams, beam #1 to beam #N, of predetermined patterns or random patterns. The N transmission beams, beam #1 to beam #N, generated in radio base station eNB #5, are made orthogonal to each other. In this radio communication system, transmission beams beam #1 to beam #N are generated by using radio resources (frequency band, time slots, etc.) of predetermined patterns or random patterns.

Figure 6:
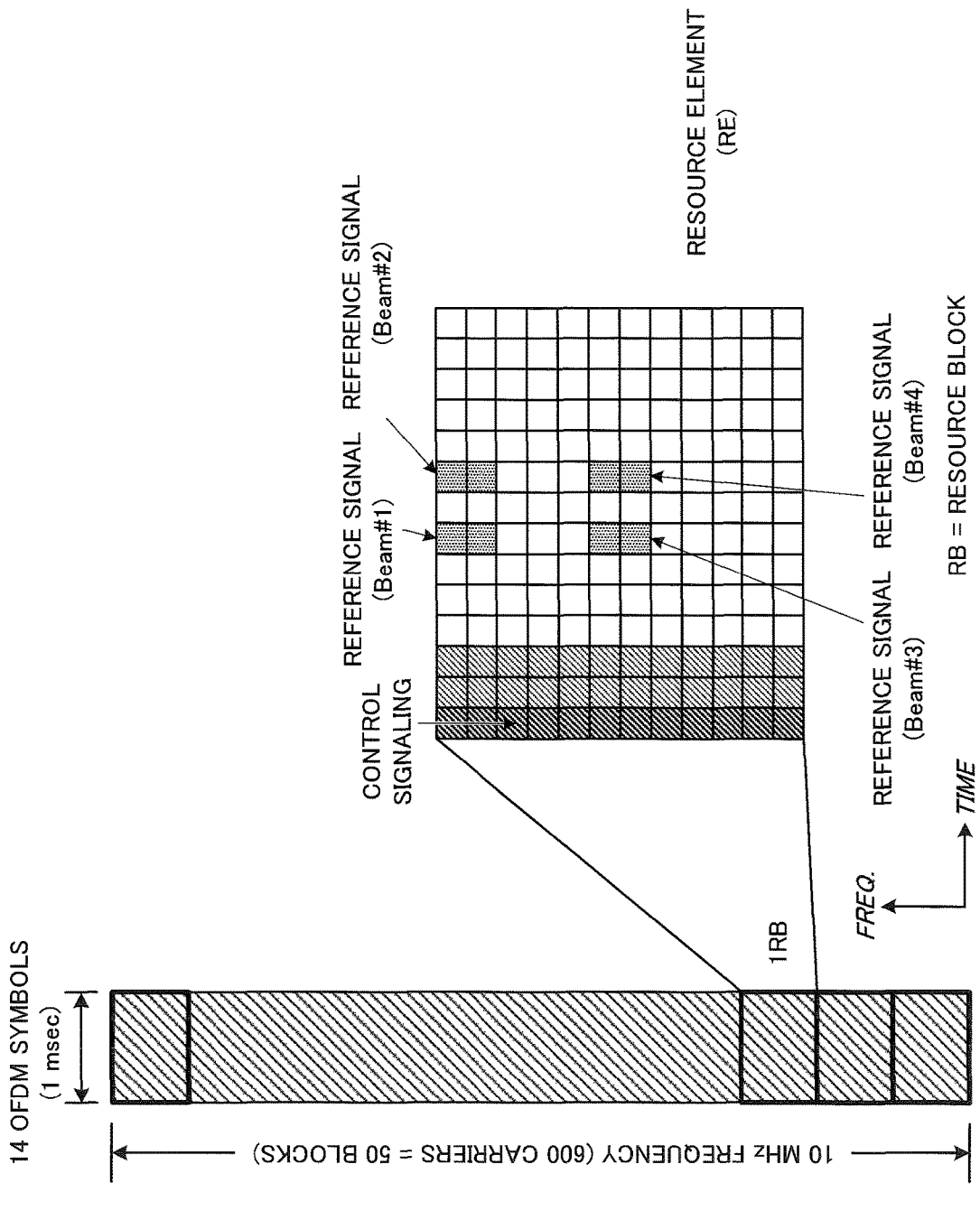
FIG. 6 is a schematic diagram to show an example radio resource structure of downlink reference signals that are transmitted from a radio base station.

In each of the coverage areas of transmission beams beam #1 to beam #N, a plurality of user terminals UE #5 are placed. Radio base station eNB #5 transmits downlink reference signals (CSI-RSs (Channel State Information Reference Signals), DM-RSs (DeModulation Reference Signals) and so on), which are specific to each of transmission beams beam #1 to beam #N, to a plurality of user terminals UE #5. FIG. 6 is a schematic diagram to show an example radio resource structure of downlink reference signals transmitted from a radio base station, illustrating a case where four transmission beams beam #1 to beam #4 are generated at the same time. As shown in FIG. 6, downlink reference signals, which are specific to each transmission beam, are multiplexed over, for example, the PDSCH (Physical Downlink Shared CHannel) region of each resource block (RB). As for the method of multiplexing reference signals for a plurality of user terminals UE #5 in each transmission beam, a reference signal multiplexing method that is suitable for conventional non-orthogonal access multiplexing may be employed.

Each user terminal UE #5 performs channel estimation based on the beam-specific downlink reference signals transmitted in each transmission beam beam #1 to beam #N, and feeds back channel quality information (CQI) to radio base station eNB #5. Radio base station eNB #5 determines the set of a plurality of user terminals UE #5 to be non-orthogonal-multiplexed in each transmission beam beam #1 to beam #N, based on the CQIs that are fed back. Note that the information to be fed back from each user terminal UE #5 is by no means limited to channel quality information (CQI). At least, channel state information (CSI) to represent channel states has to be fed back.

The set of a plurality of user terminals UE #5 to be non-orthogonal-multiplexed is determined based on an arbitrary scheduling metric so that the indicator values for user terminal selection such as the total sum rate are maximized. For example, in an arbitrary frequency block b, interference by all the users i that satisfy $h_{i,b}/N_{i,b} < h_{k,b}/N_{k,b}$ can be canceled by user k's SIC, so that user k's throughput $R^{(sic)}(k)$ can be represented by following formula 1:

$$R^{(sic)}(k) = \sum_{b=1}^{B} W\log_2\left(1 + \frac{h_{k,b}P_{k,b}}{\sum_{i=1, \frac{h_{k,b}}{N_{k,b}} < \frac{h_{i,b}}{N_{i,b}}}^{K} h_{k,b}P_{i,b} + WN_{k,b}}\right) \quad \text{[Formula 1]}$$

When scheduling to maximize the worst user throughput (minimum throughput) is executed, it is possible to determine the set of a plurality of user terminals UE #5 to be non-orthogonal-multiplexed, by solving the problem with optimal power allocation represented by following formulas 2 and 3. K is the total number of user terminals, B is the total number of transmission beams, and P is the sum value of transmission power.

$$\text{maximize} \min_k R^{(sic)}(k) \qquad \text{[Formula 2]}$$

$$\text{subject to } P_{k,b} \geq 0, \forall k, b, \sum_{b=1}^{B} \sum_{k=1}^{K} P_{k,b} \leq P \qquad \text{[Formula 3]}$$

When the set of a plurality of user terminals UE #5 to be non-orthogonal-multiplexed in each transmission beam beam #1 to beam #N is determined, radio base station eNB #5 non-orthogonal-multiplexes the downlink signals for corresponding user terminals UE #5 in each transmission beam beam #1 to beam #N by superposition coding. That is, signals for a plurality of user terminals UE #5 are multiplexed over the same radio resources (frequency band, time slots, etc.) by changing the transmission power. Also, to each user terminal #5, information of other user terminals #5, which is necessary upon interference cancelation by SIC, is reported.

Figure 5B:
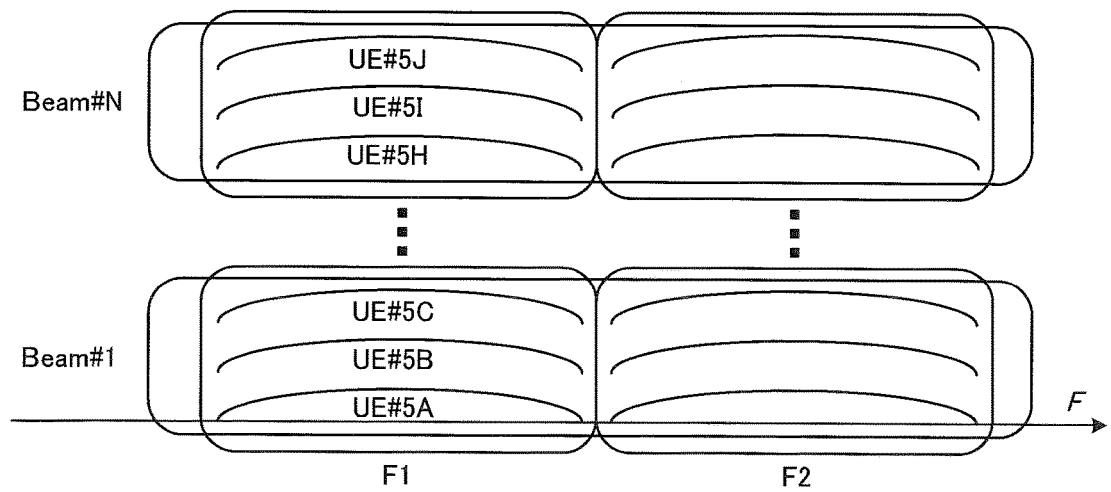

As shown in FIG. 5B, in part of the frequency bands f1, downlink signals to correspond to the set of a plurality of user terminals UE #5 of each transmission beam beam #1 to beam #N are non-orthogonal-multiplexed. For example, in FIG. 5B, downlink signals for user terminals UE #5A, UE #5B and UE #5C are non-orthogonal-multiplexed in the frequency band f1 of transmission beam beam #1. Also, downlink signals for user terminals UE #5H, UE #5I and UE #5J are non-orthogonal-multiplexed in the frequency band f1 of transmission beam beam #N.

Note that other signals (downlink signals or uplink signals) are multiplexed in the frequency bands f2 of transmission beams beam #1 to beam #N. In this way, although FIG. 5B shows a radio resource structure (orthogonal/non-orthogonal hybrid multiple access) which combines orthogonal multiplexing and non-orthogonal multiplexing by frequency bands f1 and f2, it is equally possible to apply non-orthogonal multiplexing alone to the whole frequency band.

In each transmission beam beam #1 to beam #N, the transmission power of the signals to be non-orthogonal-multiplexed is determined based on CQIs (or CSI) that are fed back. For example, as shown in FIG. 5B, in transmission beam beam #1, radio base station eNB #5 minimizes the transmission power for user terminal UE #5A having the highest received SINR (the lowest path loss), and maximizes the transmission power for user terminal UE #5C having the lowest received SINR (the largest path loss). Also, in transmission beam beam #N, radio base station eNB #5 minimizes the transmission power for user terminal UE #5H having the highest received SINR (the lowest path loss), and maximizes the transmission power for user terminal UE #5J having the lowest received SINR (the largest path loss).

FIG. 7 is a schematic diagram to explain how downlink signals that are transmitted by non-orthogonal multiplexing are received in each user terminal. In FIG. 7, the received SINR at user terminal UE #7B is lower than the received SINR at user terminal UE #7A. Alternatively, the path loss between radio base station eNB #7 and user terminal UE #7B is greater than the path loss between radio base station eNB #7 and user terminal UE #7A. Consequently, radio base station eNB #7 configures the transmission power for user terminal UE #7A where the received SINR is high (the path loss is low) lower than the transmission power for user terminal UE #7B where the received SINR is low (the path loss is high).

In the location where user terminal UE #7B serves, the signal for user terminal UE #7A becomes sufficiently weak. Consequently, user terminal UE #7B can decode the signal for user terminal UE #7B without suffering interference from the signal for user terminal UE #7A. The signal for user terminal UE #7B is strong in the location where user terminal UE #7A serves. Consequently, user terminal UE #7A receives the signal for user terminal UE #7B in addition to the signal for user terminal UE #7A.

The signals for user terminal UE #7A and UE #7B are multiplexed in an identifiable manner. Consequently, user terminal UE #7A cancels the signal for user terminal UE #7B by SIC and separates the signal for user terminal UE #7A. As a result of this, user terminal UE #7A can decode the signal for user terminal UE #7A. The same holds with user terminals UE #7C and UE #7D. That is, user terminal UE #7D assumes decodes the signal for user terminal UE #7D assuming that there is little interference from the signal for user terminal UE #7C. User terminal UE #7C cancels the signal for user terminal UE #7D by SIC, and separates and decodes the signal for user terminal UE #7C.

The above-described SIC is employed to cancel signals for user terminals UE where the condition of the transmission path is poorer (the received SINR is lower or the path loss is greater) than at the subject terminal. Signals for user terminals UE where the condition of the transmission path is poorer than at the subject terminal are transmitted with higher power than the signal for the subject terminal, and therefore can be decoded properly at the subject terminal. Consequently, interference by signals for such user terminals UE is adequately canceled by means of SIC. Signals for user terminals UE where the condition of the transmission path is better than at the subject terminal are transmitted with lower transmission power than the signal for the subject terminal, so that the interference can be ignored.

With the radio communication scheme of the present example structured in this way, a transmission signal vector x can be represented by following formula 4. B is the total number of transmission beams, $m_b$ is the beam vector (precoder) of the b-th transmission beam, $P_{b,u}$ is the transmission power for the u-th user terminal that is superposition-coded in the b-th transmission beam, and $s_{b,u}$ is the signal for the u-th user terminal that is superposition-coded in the b-th transmission beam.

$$x = \sum_{b=1}^{B} m_b \sum_{u=1}^{n(b)} \sqrt{P_{b,u}} s_{b,u'} \qquad \text{[Formula 4]}$$

Also, following formula 5 holds. $P_{b'}$ is the transmission power of the b-th transmission beam, and P is the sum value of the transmission power of all transmission beams.

$$\sum_{u=1}^{n(b)} P_{b,u} = P_{b'} \sum_{b=1}^{B} P_b = P \qquad \text{[Formula 5]}$$

Also, the received signal vector $y_{b,u}$ of the u-th user terminal that is superposition-coded in the b-th transmission beam is represented by following formula 6. $H_{b,u}$ is the channel matrix for the u-th user terminal that is superposition-coded in the b-th transmission beam, and $w_{b,u}$ is the vector of the noise/interference against the u-th user terminal that is superposition-coded in the b-th transmission beam.

$$y_{b,u} = H_{b,u}x + w_{b,u} = H_{b,u}\sum_{b'=1}^{B} m_{b'}\sum_{u'=1}^{n(b')} \sqrt{P_{b',u'}}\, s_{b',u'} + w_{b,u} \quad \text{[Formula 6]}$$

Interference between the transmission beams can be suppressed by means of receiving linear filtering, not by SIC. Considering this, a received signal vector $\tilde{y}_{b,u}$ after the filtering of the u-th user terminal that is superposition-coded in the b-th transmission beam is represented by following formula 7. $v^H_{b,u}$ is the receiving filter vector of the u-th user terminal that is superposition-coded in the b-th transmission beam.

$$\tilde{y}_{b,u} = v^H_{b,u}y_{b,u} = v^H_{b,u}H_{b,u}m_b\sum_{u'=1}^{n(b)} \sqrt{P_{b,u'}}\, s_{b,u'} + $$
$$v^H_{b,u}H_{b,u}\sum_{\substack{b'=1\\b'\neq b}}^{B} m_{b'}\sum_{u'=1}^{n(b')} \sqrt{P_{b',u'}}\, s_{b',u'} + v^H_{b,u}w_{b,u} \quad \text{[Formula 7]}$$

Following formula 8 is an equivalent channel representation to above formula 7. $\tilde{w}_{b,u}$ is the power noise against the u-th user terminal that is superposition-coded in the b-th transmission beam. $g_{b,u}$ is represented by following formula 9.

$$\tilde{y}_{b,u} = g_{b,u}\sum_{u'=1}^{n(b)} \sqrt{P_{b,u'}}\, s_{b,u'} + \tilde{w}_{b,u} \quad \text{[Formula 8]}$$

$$g_{b,u} = \sqrt{\frac{|v^H_{b,u}H_{b,u}m_b|^2}{\sum_{\substack{b'=1\\b'\neq b}}^{B} P_{b'}|v^H_{b,u}H_{b,u}m_{b'}|^2 + v^H_{b,u}E[w_{b,u}w^H_{b,u}]v_{b,u}}} \quad \text{[Formula 9]}$$

It is clear, from above formula 8, that a downlink communication channel can be seen as a degraded BC. Consequently, with the radio communication scheme of the present example, interference in each transmission beam can be adequately suppressed by means of receiving SIC.

Figure 8B:
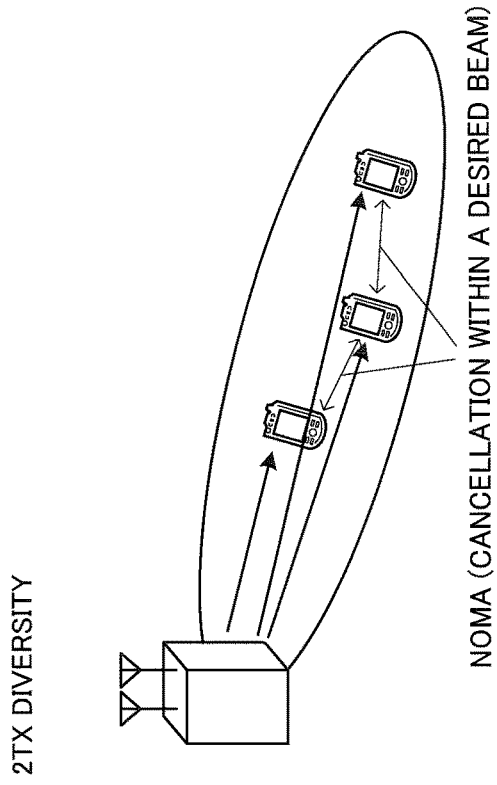
FIGS. 8A and 8B provide schematic diagrams to show example transmission schemes that are supported by the radio communication scheme of the present embodiment.
Figure 8A:
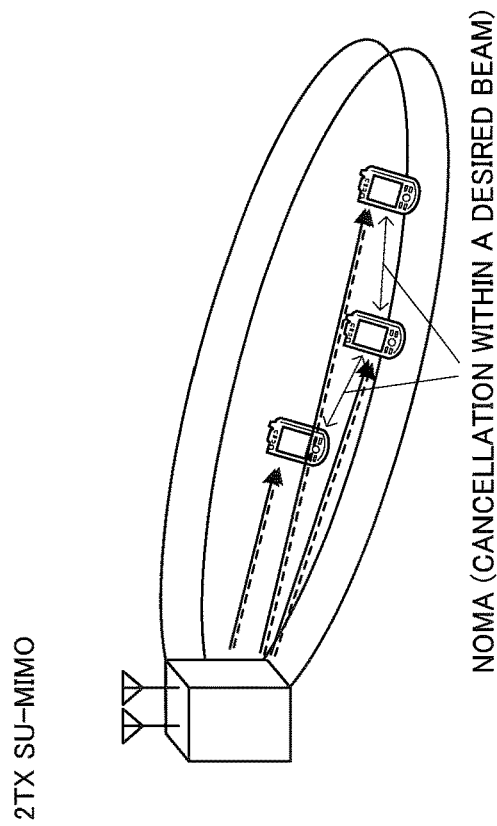

As noted earlier, although NOMA is applied to MU-MIMO transmission according to the radio communication scheme of the present embodiment, other transmission schemes are supported as well. FIG. 8 provides schematic diagrams to show examples of transmission schemes that are supported by the radio communication scheme of the present embodiment. FIG. 8A shows an example of SU-MIMO transmission, and FIG. 8B shows an example of transmission diversity. By allowing a radio communication system to support the SU-MIMO transmission of FIG. 8A, it is possible to increase the peak rate. Also, for example, in an application environment where the precoding gain is little, the transmission diversity of FIG. 8B is effective.

FIG. 9 provides schematic diagrams to show examples of radio resource structures of demodulation reference signals (DM-RSs) that are transmitted from a radio base station. In FIG. 9A to FIG. 9D, the horizontal axis is the radio resources (time and frequency), and the vertical axis is the transmission power. As shown in FIG. 9A, when NOMA is applied to transmission beams by one transmitting antenna, signals for each user terminal UE #9 are transmitted using the same radio resources, with different power. In this case, a DM-RS that is common between user terminals UE #9 can be used as a reference signal for demodulation. Also, as shown in FIG. 9B, in SU-MIMO transmission to use transmission beams by a plurality of transmitting antennas (here, two transmitting antennas TX1 and TX2), a plurality of (two) information data sequences (layers) for user terminal UE #9A are multiplexed over the same radio resources. In this case, for example, DM-RSs that are orthogonal between the layers can be used as reference signals for demodulation.

Figure 9A:
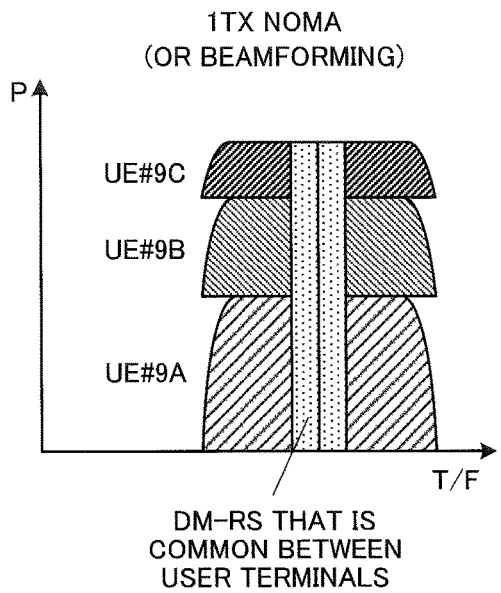
FIGS. 9A-9D provide schematic diagrams to show example radio resource structures of demodulation reference signals that are transmitted from a radio base station.
Figure 9B:
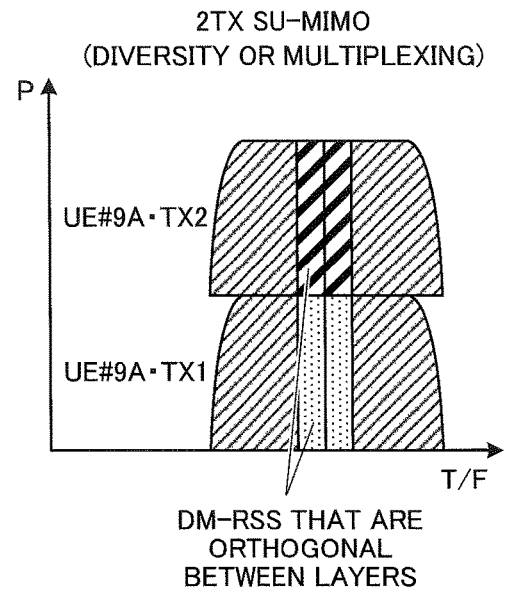
Figure 9C:
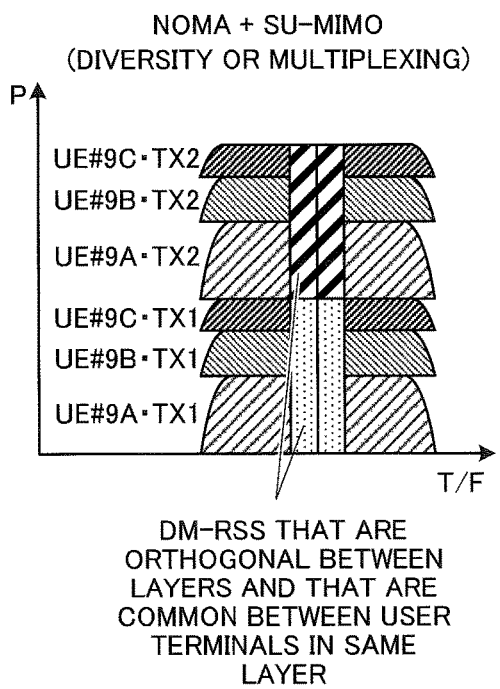

As shown in FIG. 9C, when NOMA is applied to SU-MIMO transmission where transmission beams by a plurality of transmitting antennas (here, two transmitting antennas TX1 and TX2) are used, a plurality of (two) information data sequences (layers) for each user terminal UE #9 are multiplexed over the same radio resources. Here, the signals for user terminals UE #9 are transmitted with different power. In this case, for example, DM-RSs that are common between the user terminals in the same layer and that are orthogonal between the layers can be used as reference signals for demodulation.

Figure 9D:
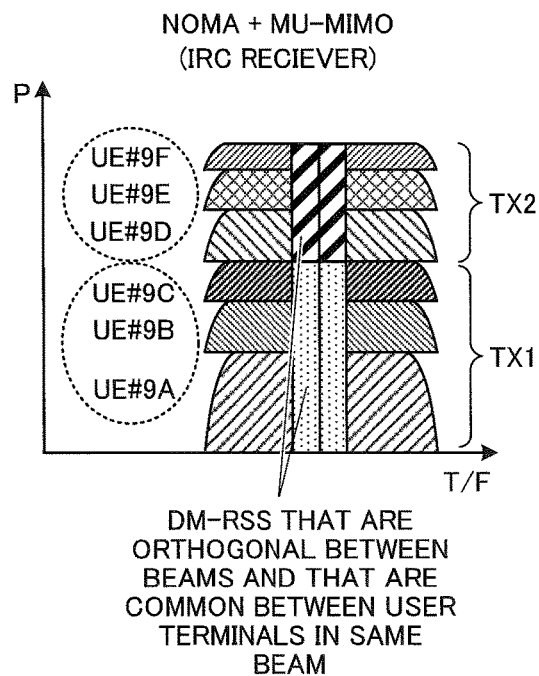

Furthermore, as shown in FIG. 9D, when NOMA is applied to MU-MIMO transmission where transmission beams by a plurality of transmitting antennas (here, two transmitting antennas TX1 and TX2) are used, signals for each user terminal UE #9 are multiplexed over the same radio resources. In the same transmission beam, signals for each user terminal #9 are transmitted with different power. In this case, for example, DM-RSs that are common between user terminals UE #9 in the same transmission beam and that are orthogonal between the transmission beams can be used as reference signals for demodulation. When a DM-RS structure that is common between user terminals is employed in this way, the transmission power ratio for each user terminal is reported. Note that, although cases have been shown here where DM-RS structures that are common between user terminals are employed, it is equally possible to employ structures in which dedicated DM-RSs are transmitted on a per user terminal basis.

Figure 10:
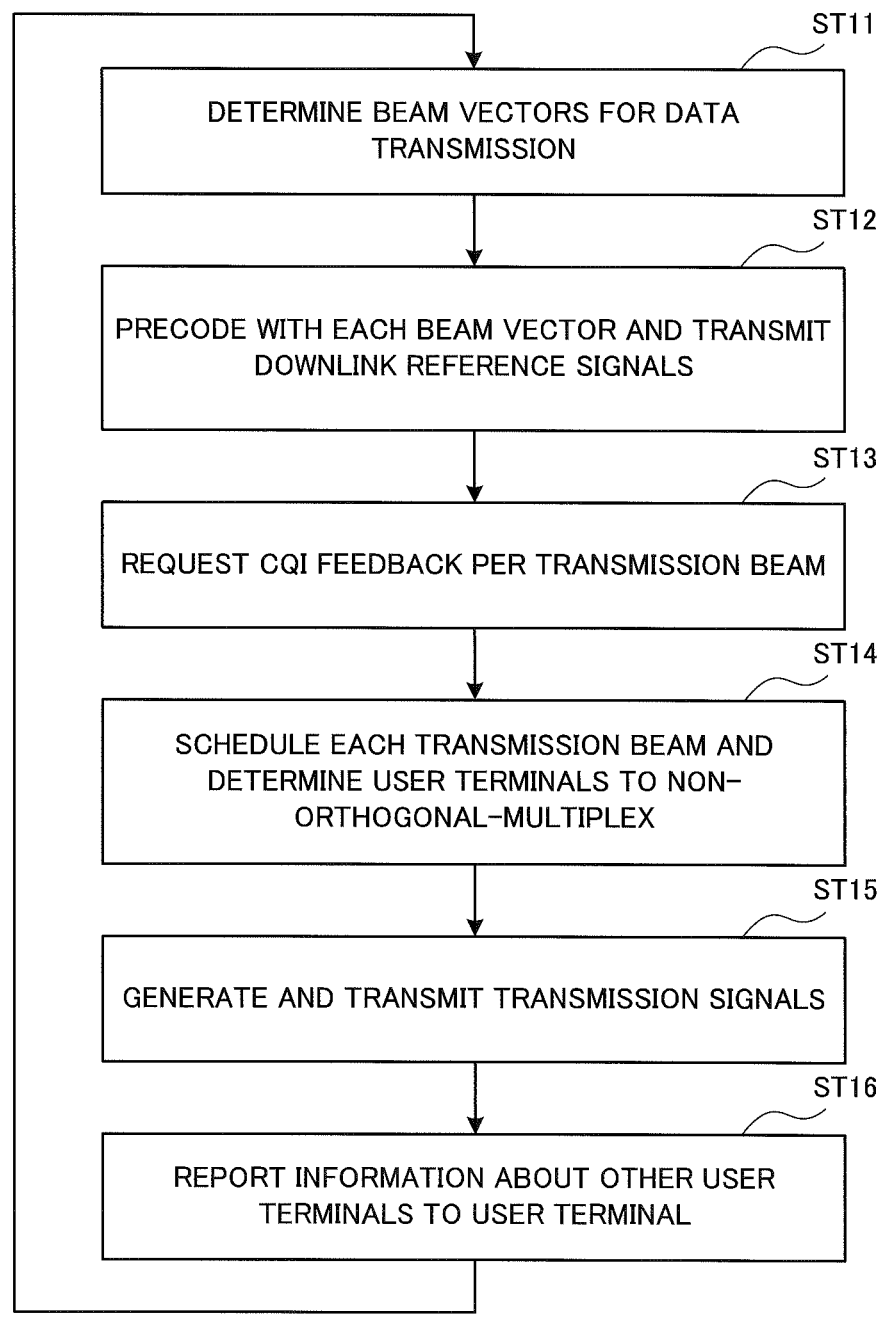
FIG. 10 is a flow chart to show a control flow on the radio base station side in the radio communication scheme according to the first example.

Control flows of the radio communication scheme of the present example will be described. FIG. 10 is a flow chart to show the control flow on the radio base station side. The radio base station eNB first determines the beam vectors (precoders) of the transmission beams to use in data transmission (step ST11). For example, when two transmitting antennas are used, two orthogonal beam vectors are generated randomly. Then, using transmission beams that are pre-coded with each beam vector, downlink reference signals that are specific to each transmission beam are transmitted to user terminals UE (step ST12).

Next, the radio base station eNB requests all the user terminals UE to feed back CQIs based on the downlink reference signals transmitted in each transmission beam (step ST13). For example, the radio base station eNB commands the user terminals UE to feed back CQIs alone (which are equivalent to the SINR). In this case, it is possible to reduce the overhead pertaining to feedback. However, the information to feed back is by no means limited to CQIs. At least, CSI to represent channel states has only to be fed back.

Note that, in this feedback, interference from other cells (other radio base stations eNB) is taken into consideration.

When CQIs are fed back from the user terminals UE, the radio base station eNB schedules each transmission beam based on the CQIs fed back, and determines the user terminals UE to non-orthogonal-multiplex (step ST14). That is, the radio base station eNB selects the user terminals UE to be subject to frequency scheduling, and determines the user terminals UE to be subject to non-orthogonal multiplexing. The user terminals UE to be subject to non-orthogonal multiplexing are determined based on, for example, the above-mentioned scheduling metric.

After that, the radio base station eNB generates transmission signals based on scheduling information and information about the user terminals to non-orthogonal-multiplex, and non-orthogonal-multiplexes and transmits these transmission signals in each transmission beam (step ST15). Also, the radio base station eNB reports, to each user terminal UE, information about the other user terminals UE to be non-orthogonal-multiplexed in the same transmission beam (step ST16). This reporting is made by using, for example, higher layer signaling (RRC signaling and so on), signaling by PDCCH control information and so on.

Figure 11:
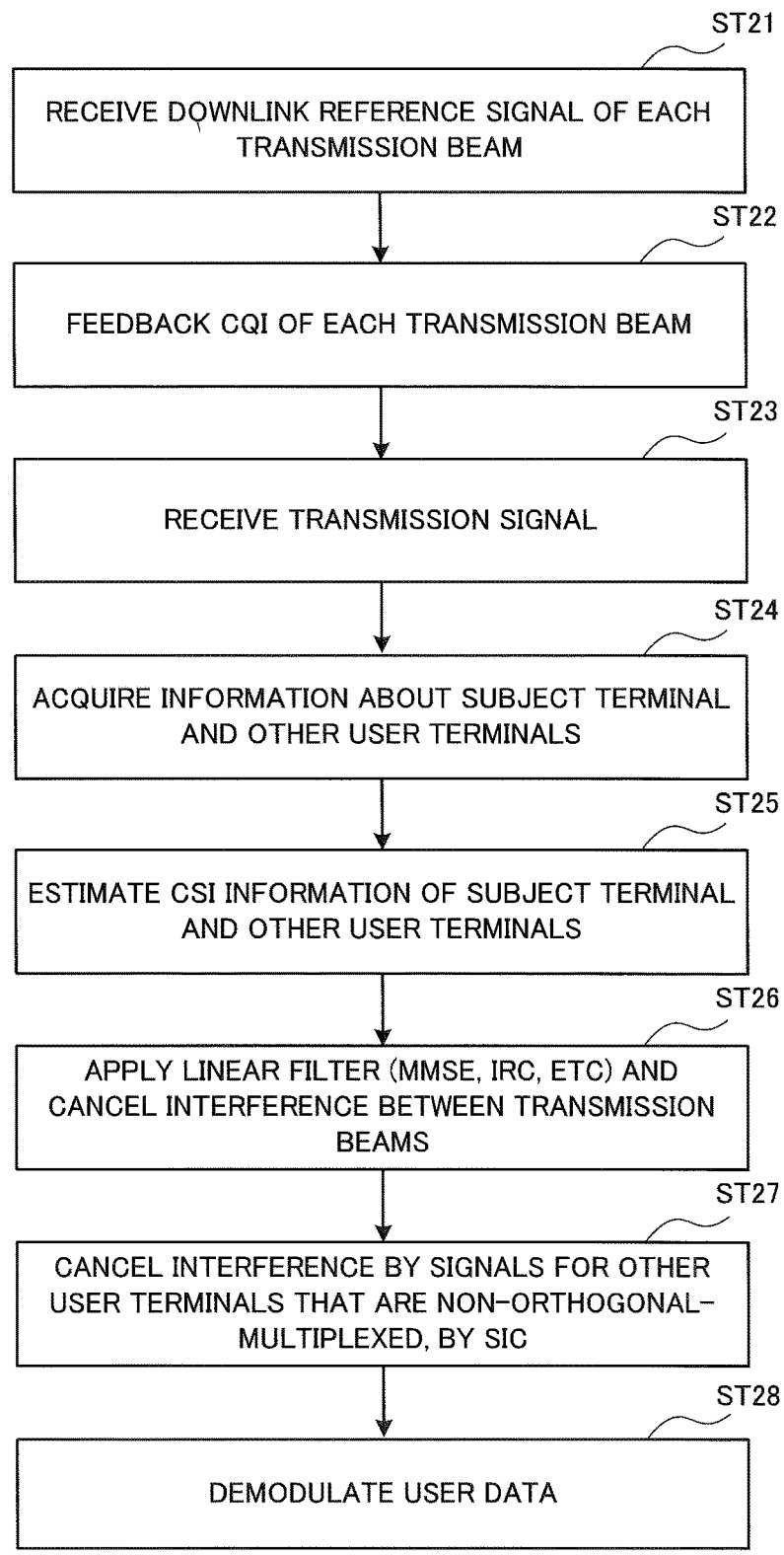
FIG. 11 is flow chart to show a control flow on the user terminal side in the radio communication scheme according to the first example.

FIG. 11 is a flow chart to show the control flow on the user terminal side. A user terminal UE receives the downlink reference signals transmitted in each transmission beam (step ST21), and calculates and feeds back CQIs to the radio base station eNB (step ST22). Note that the information to feed back is preferably CSI that represents the channel states.

After that, the user terminal UE receives the transmission signals transmitted from the radio base station eNB with control information (step ST23), and acquires information for the subject terminal and information for the other user terminals UE that are non-orthogonal-multiplexed with the subject terminal in the same transmission beam (step ST24). Also, the user terminal UE estimates CSI information with respect to the subject terminal by way of channel estimation (step ST25). The user terminal UE estimates CSI information with respect to the other user terminals UE based on the reference signals for the other user terminals UE reported (step ST25).

After that, the user terminal UE cancels the interference between the transmission beams by using a linear filter such as MMSE and IRC (step ST26). For example, in a structure to use two receiving antennas, interference between transmission beams is canceled by using an IRC receiver or an MMSE receiver of a linear filter. Next, interference by signals for the other user terminals that are non-orthogonal-multiplexed in the same transmission beam is canceled by means of SIC (step ST27). Here, SIC is employed to cancel the signals for user terminals UE where the condition of the transmission path is poorer (the received SINR is lower or the path loss is greater) than at the subject terminal. Signals for user terminals UE where the condition of the transmission path is poorer than at the subject terminal are transmitted with higher power than the signals for the subject terminal, and therefore can be decoded properly at the subject terminal. Consequently, interference by signals for such user terminals UE is adequately canceled by means of SIC. Signals for user terminals UE where the condition of the transmission path is better (the received SINR is higher or the path loss is lower) than at the subject terminal are transmitted with lower transmission power than the signals for the subject terminal, so that the interference can be ignored. After having canceled the interference by the signals for the other user terminals UE, the user terminal UE demodulates the user data for the subject terminal (step ST28).

In this way, with the radio communication scheme according to the present example, non-orthogonal multiplexing is applied to opportunistic beamforming, which can achieve equivalent system characteristics to MIMO transmission, so that it is possible to improve the throughput and system capacity even more.

Second Example

A second example of a radio communication scheme to apply non-orthogonal multiplexing (NOMA) to opportunistic beamforming will be described with the present example. Note the present example shares many parts with the first example in common. Consequently, the differences will primarily be described with the present example.

Figure 12:
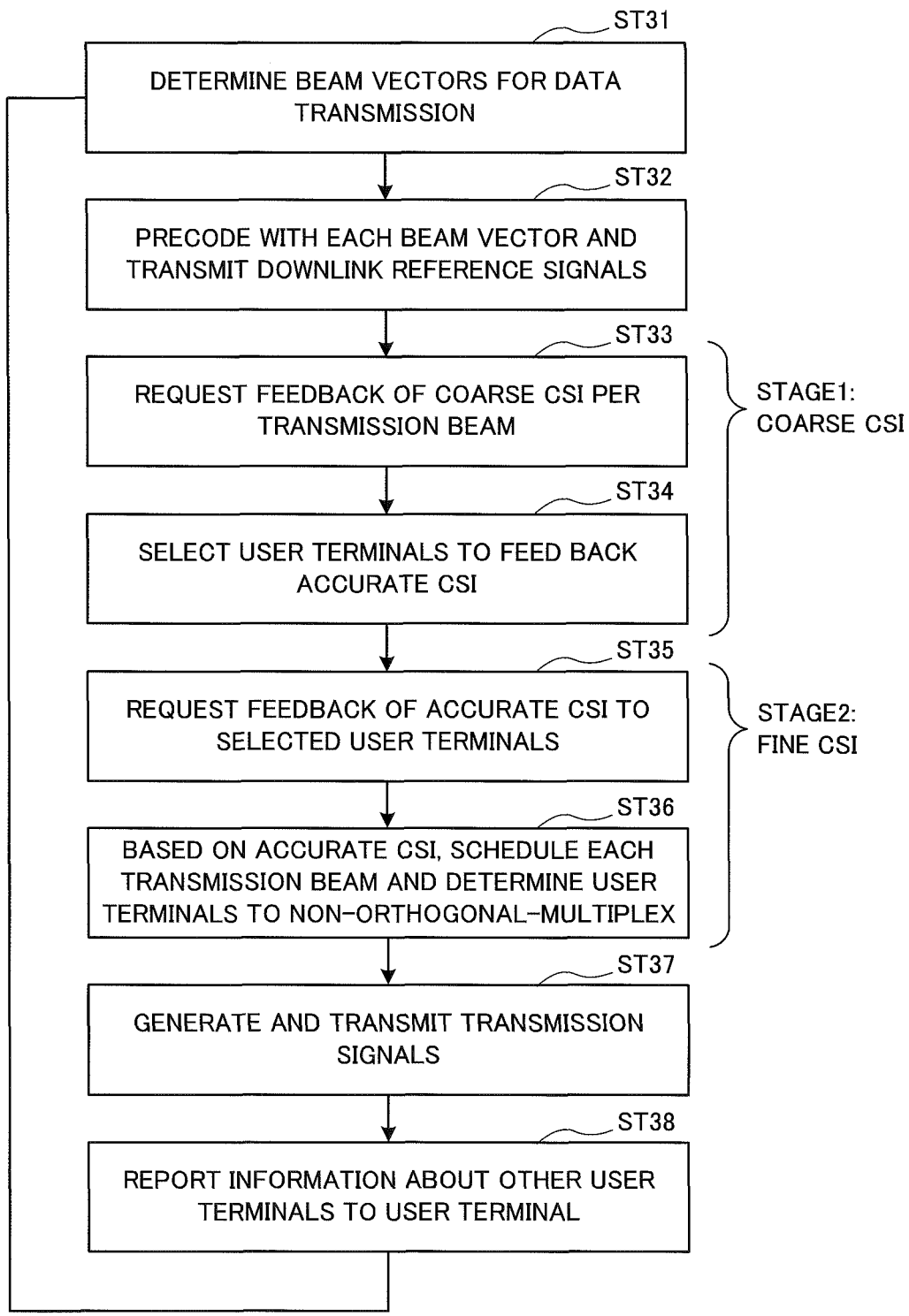
FIG. 12 is a flow chart to show a control flow on the radio base station side in a radio communication scheme according to a second example.

The radio communication scheme according to the present example uses a first stage to feed back coarse channel state information and a second stage to feed back accurate channel state information. FIG. 12 is a flow chart to show the control flow on the radio base station side. The radio base station eNB first determines the beam vectors (precoders) of the transmission beams to use in data transmission (step ST31). Then, by using the transmission beams pre-coded with each beam vector, the radio base station eNB transmits downlink reference signals that are specific to each transmission beam, to user terminals UE (step ST32).

Next, the radio base station eNB requests all the user terminals UE to feed back coarse CSI based on the downlink reference signals transmitted in each transmission beam (step ST33). That is, the radio base station eNB makes the user terminals UE feed back CSI, in which the channel estimation results are quantized with a small number of bits. For the coarse CSI, for example, CQIs (which are equivalent to the SINR) can be used. The coarse CSI to be fed back is quantized with a small number of bits, so that it is possible to reduce the overhead. Note that, in this feedback, interference from other cells (other radio base stations eNB) is taken into account.

After that, the radio base station eNB selects a plurality of user terminals UE to make feed back accurate CSI (step ST34). This selection is made based on the coarse CSI fed back from the user terminals UE. To be more specific, a plurality of user terminals UE that may be subject to non-orthogonal multiplexing in each transmission beam are selected. The step of requesting a feedback of coarse CSI (step ST33), and the step of selecting a plurality of user terminals UE to make feed back accurate CSI (step ST34) constitute the first stage (the radio base station side) of the radio communication scheme according to the present example.

When the first stage is finished, the radio base station eNB requests the user terminals UE, selected in the above step, to feed back accurate CSI (fine CSI) based on the downlink reference signals transmitted in each transmission beam (step ST35). That is, the radio base station eNB makes the user terminals UE to feed back CSI that is quantized with a larger number of bits than the coarse CSI. For the accurate CSI, for example, the SINR that is quantized with a large number of bits and so on can be used.

Next, the radio base station eNB schedules each transmission beam based on the accurate CSI that is fed back, and determines the user terminals UE to non-orthogonal-multiplex (step ST36). That is, the radio base station eNB selects the user terminals UE to be subject to frequency scheduling and selects the user terminals UE to be subject to non-orthogonal multiplexing based on the accurate CSI. The user terminals UE to be subject to non-orthogonal multiplexing are determined based on, for example, the above-mentioned scheduling metric. Here, the scheduling is carried out and the user terminals UE to non-orthogonal-multiplex are determined based on the accurate CSI, so that it is possible to improve the quality of communication sufficiently. The step of requesting a feedback of accurate CSI (step ST35), and the step of carrying out scheduling and determining the user terminals UE to non-orthogonal-multiplex (step ST36) constitute the second stage (the radio base station side) of the radio communication scheme according to the present example.

After that, the radio base station eNB generates transmission signals based on scheduling information and information about the user terminals to non-orthogonal-multiplex, and non-orthogonal-multiplexes and transmits these transmission signals in each transmission beam (step ST37). Also, the radio base station eNB reports, to each user terminal UE, information about the other user terminals UE to be non-orthogonal-multiplexed in the same transmission beam (step ST38). This reporting is made by using, for example, higher layer signaling (RRC signaling and so on), signaling by PDCCH control information, and so on. The reporting is carried out by using, for example, higher layer signaling (RRC), signaling by PDCCH control information, and so on.

Figure 13:
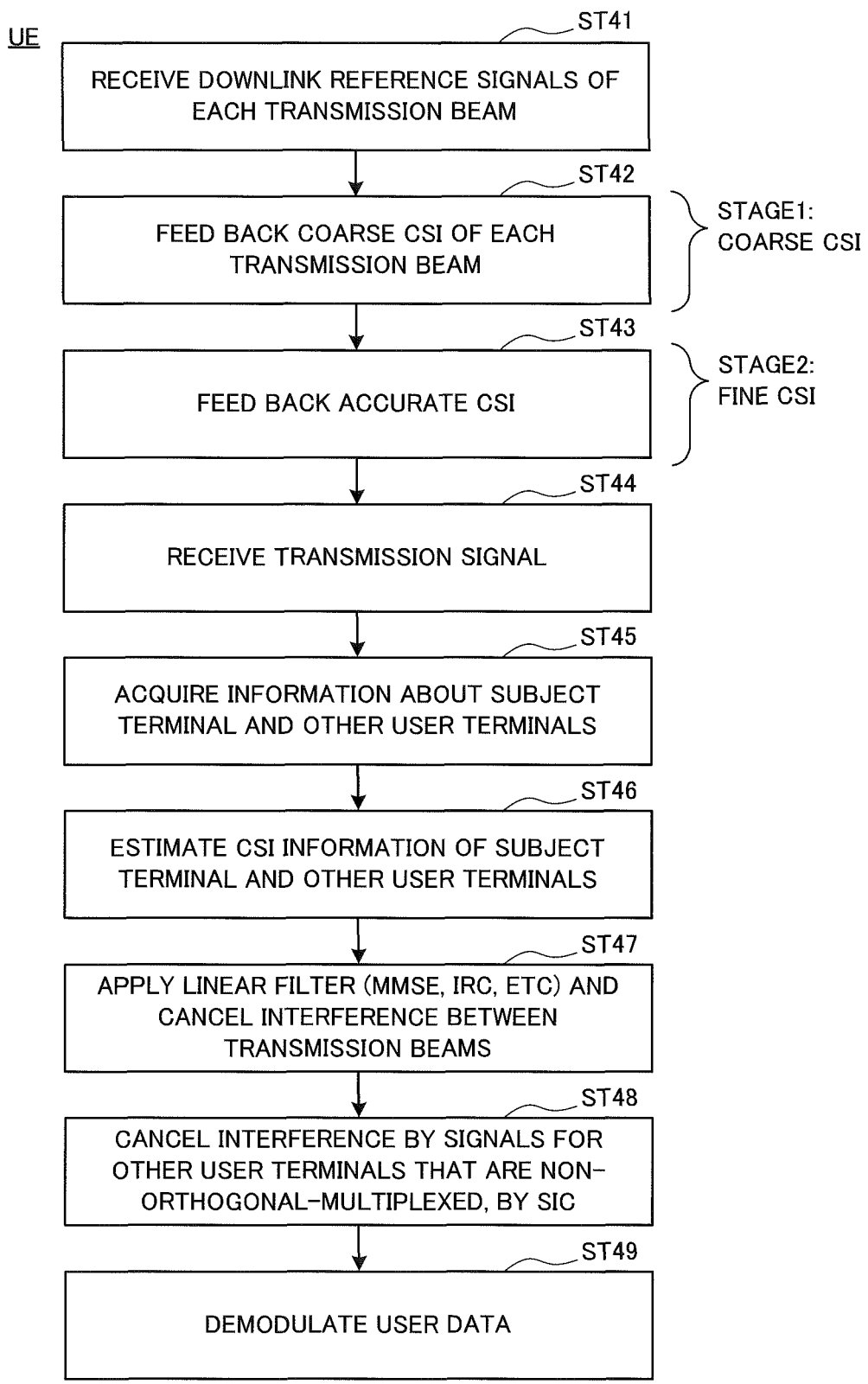
FIG. 13 is a flow chart to show a control flow on the user terminal side in the radio communication scheme according to the second example.

FIG. 13 is a flow chart to show the control flow on the user terminal side. A user terminal UE receives the downlink reference signals transmitted in each transmission beam (step ST41), and calculates and feeds back coarse CSI to the radio base station eNB (step ST42). That is, the user terminal UE feeds back CSI, in which the channel estimation result is quantized with a small number of bits, to the radio base station eNB. This step (step ST42) constitutes the first stage (the user terminal side) of the radio communication scheme according to the present example.

After that, if there is a request for a feedback of accurate CSI from the radio base station eNB, the user terminal UE feeds back accurate CSI to the radio base station eNB (step ST43). That is, the user terminal UE feeds back CSI that is quantized with a larger number of bits than the coarse CSI, to the radio base station eNB. This step (step ST43) constitutes the second stage (the user terminal side) of the radio communication scheme according to the present example.

After that, the user terminal UE receives the transmission signals transmitted from the radio base station eNB with control information (step ST44), and acquires information for the subject terminal and information for the other user terminals UE that are non-orthogonal-multiplexed with the subject terminal in the same transmission beam (step ST45). Also, the user terminal UE estimates CSI information with respect to the subject terminal by way of channel estimation (step ST46). The user terminal UE estimates CSI information with respect to the other user terminals UE based on the reference signals for the other user terminals UE reported (step ST46).

After that, the user terminal UE cancels the interference between the transmission beams by using a linear filter such as MMSE and IRC (step ST47). For example, in a structure to use two receiving antennas, interference between transmission beams is canceled by using an IRC receiver. Next, interference by signals for the other user terminals that are non-orthogonal-multiplexed in the same transmission beam is canceled by means of SIC (step ST48). Here, SIC is employed to cancel the signals for user terminals UE where the condition of the transmission path is poorer (the received SINR is lower or the path loss is greater) than at the subject terminal. Signals for user terminals UE where the condition of the transmission path is poorer than at the subject terminal are transmitted with higher power than the signals for the subject terminal, and therefore can be decoded properly at the subject terminal. Consequently, interference by signals for such user terminals UE is adequately canceled by means of SIC. Signals for user terminals UE where the condition of the transmission path is better (the received SINR is higher or the path loss is lower) than at the subject terminal are transmitted with lower transmission power than the signals for the subject terminal, so that the interference can be ignored. After having canceled the interference by the signals for the other user terminals UE, the user terminal UE demodulates the user data for the subject terminal (step ST49).

In this way, with the radio communication scheme according to the present example, coarse CSI is fed back in the first stage, and a plurality of user terminals UE that may be subject to non-orthogonal multiplexing are selected, and then, in the second stage, accurate CSI is fed back, scheduling is carried out, and the user terminals to be subject to non-orthogonal multiplexing are determined, so that it is possible to reduce the overhead pertaining to feedback while maintaining high quality of communication.

(Example Structure of Radio Communication System)

Figure 14:
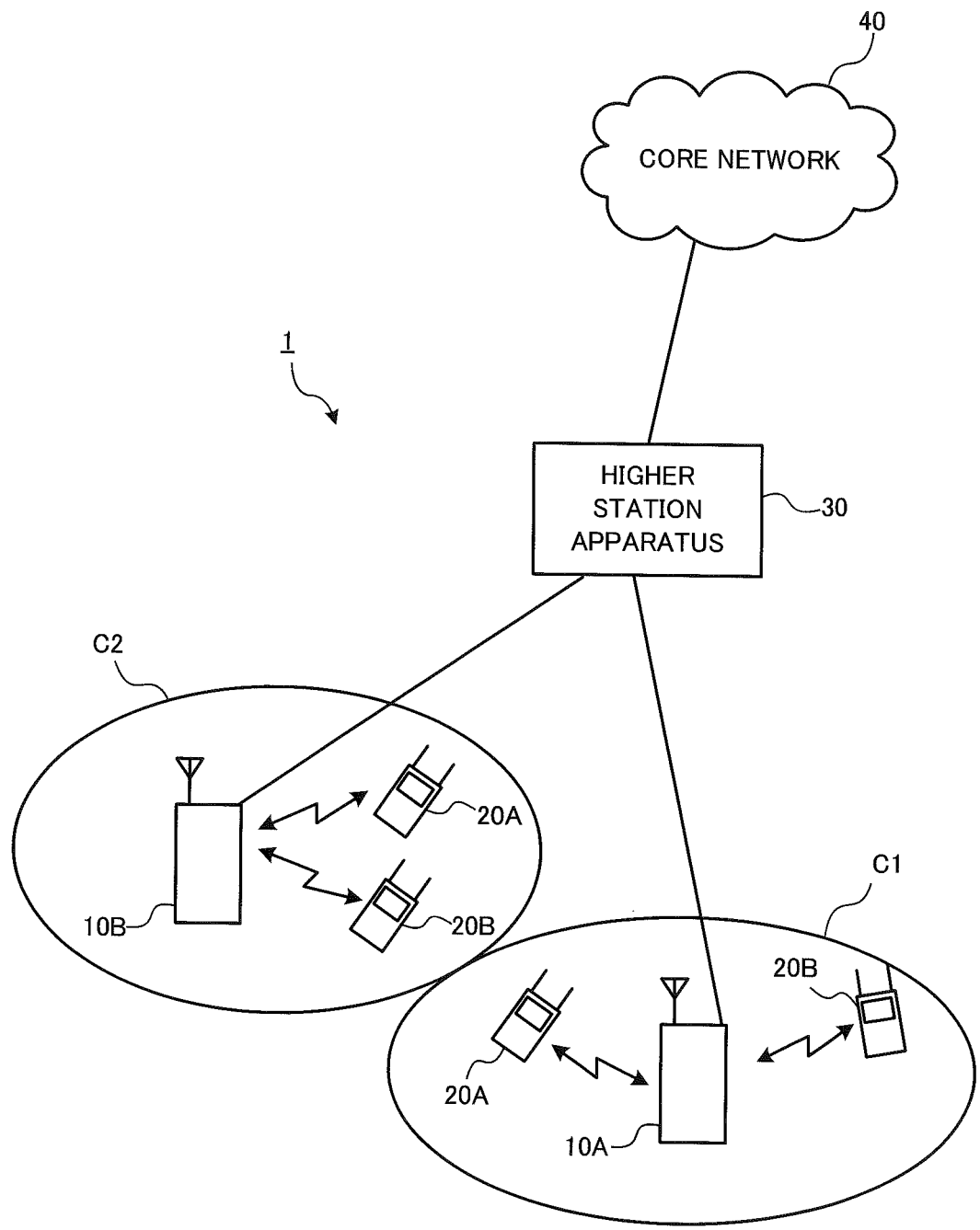
FIG. 14 is a schematic diagram to show an example structure of a radio communication system.

Now, the radio communication system according to the present embodiment will be described below in detail. FIG. 14 is a schematic diagram to show an example structure of the radio communication system according to the present embodiment. Note that the radio communication system shown in FIG. 14 is a system to accommodate, for example, the LTE system or the LTE-A (LTE-Advanced) system. This radio communication system may be referred to as "IMT-advanced," or may be referred to as "4G."

As shown in FIG. 14, the radio communication system 1 includes radio base stations 10 (10A and 10B), and a plurality of user terminals 20 (20A and 20B) that communicate with these radio base stations 10. The radio base stations 10 are connected with a higher station apparatus 30, and this higher station apparatus 30 is connected with a core network 40. Each user terminal 20 can communicate with the radio base stations 10 in cells C1 and C2. The user terminals 20 may be mobile terminals or may be fixed terminals. Note that the higher station apparatus 30 may be, for example, an access gateway apparatus, a radio network controller (RNC), a mobility management entity (MME) and so on, but is by no means limited to these.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Here, communication channels to be used in the radio communication system 1 shown in FIG. 14 will be described. Downlink communication channels include a PDSCH (Physical Downlink Shared CHannel), which is used by each user terminal 20 on a shared basis, and downlink L1/L2 control channels (PDCCH, PCFICH, PHICH and enhanced PDCCH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator CHannel). HARQ ACK and NACK for the PUSCH are transmitted by the PHICH (Physical Hybrid-ARQ Indicator CHannel).

Uplink control channels include the PUSCH (Physical Uplink Shared CHannel), which is used by each user terminal 20 on a shared basis as an uplink data channel, and the PUCCH (Physical Uplink Control CHannel), which is an uplink control channel. User data and higher control information are transmitted by this PUSCH. Also, by means of the PUCCH, downlink channel quality information (CQI: Channel Quality Indicator), ACK/NACK and so on are transmitted.

Figure 15:
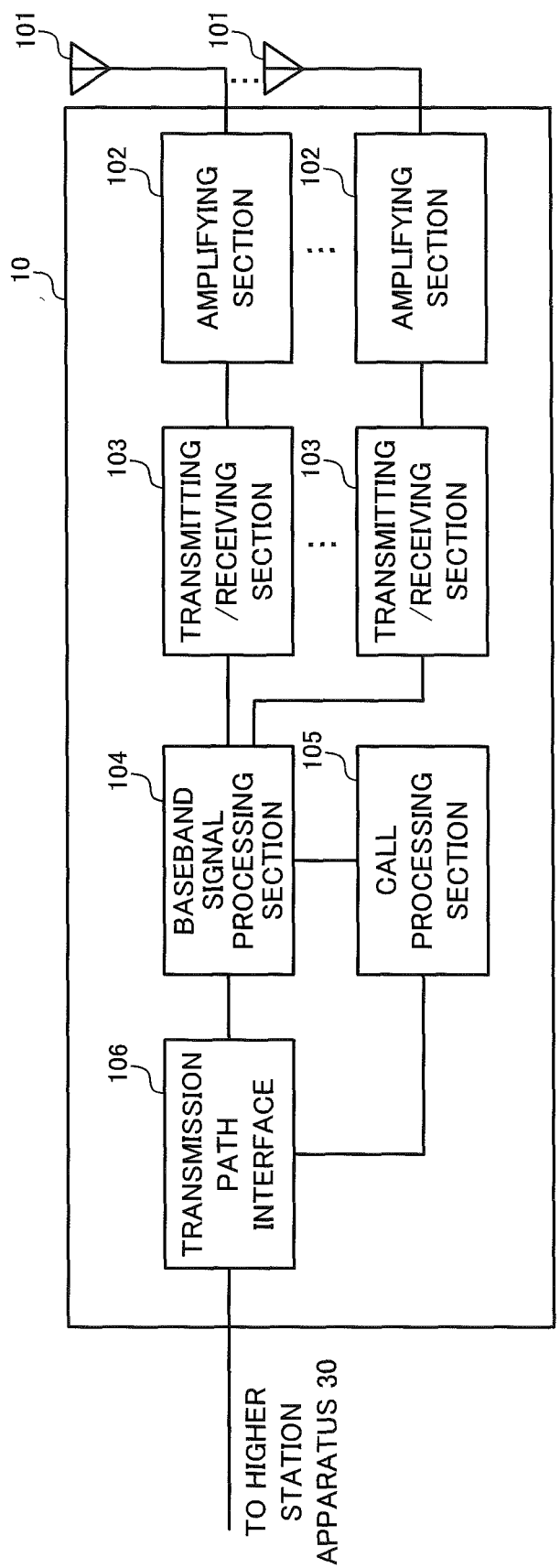
FIG. 15 is a block diagram to show an example structure of a radio base station.

FIG. 15 is a block diagram to show an example structure of a radio base station according to the present embodiment. A radio base station 10 has a plurality of transmitting/receiving antennas 101 for opportunistic beamforming, amplifying sections 102, transmitting/receiving sections 103, a baseband signal processing section 104, a call processing section 105 and a transmission path interface 106.

User data to be transmitted from the radio base station 10 to a user terminal 20 on the downlink is input from the higher station apparatus 30, into the baseband signal processing section 104, via the transmission path interface 106.

In the baseband signal processing section 104, user data that is input is subjected to a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process, and then transferred to each transmitting/receiving section 103. Furthermore, downlink control information is subjected to transmission processes such as channel coding and an IFFT process, and transferred to each transmitting/receiving section 103.

Also, the baseband signal processing section 104 reports control information for communication in the serving cell to the user terminals 20 through a broadcast channel. The information for communication in the serving cell includes, for example, the uplink or downlink system bandwidth.

Each transmitting/receiving section 103 converts the baseband signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

Data to be transmitted from the user terminal 20 to the radio base station 10 on the uplink is received in each transmitting/receiving antenna 101 and input in the amplifying sections 102. Radio frequency signals that are input from each transmitting/receiving antenna 101 are amplified in the amplifying sections 102 and sent to each transmitting/receiving section 103. The amplified radio frequency signals are converted into baseband signals in each transmitting/receiving section 103, and input in the baseband signal processing section 104.

In the baseband signal processing section 104, user data that is included in the baseband signals that are input is subjected to an inverse fast Fourier transform (IFFT) process, an inverse discrete Fourier transform (IDFT) process, error correction decoding, a MAC retransmission control receiving process, and RLC layer and PDCP layer receiving processes, and transferred to the higher station apparatus 30 via the transmission path interface 106. The call processing section 105 performs call processing such as setting up and releasing communication channels, manages the state of the radio base station 10 and manages the radio resources.

Figure 16:
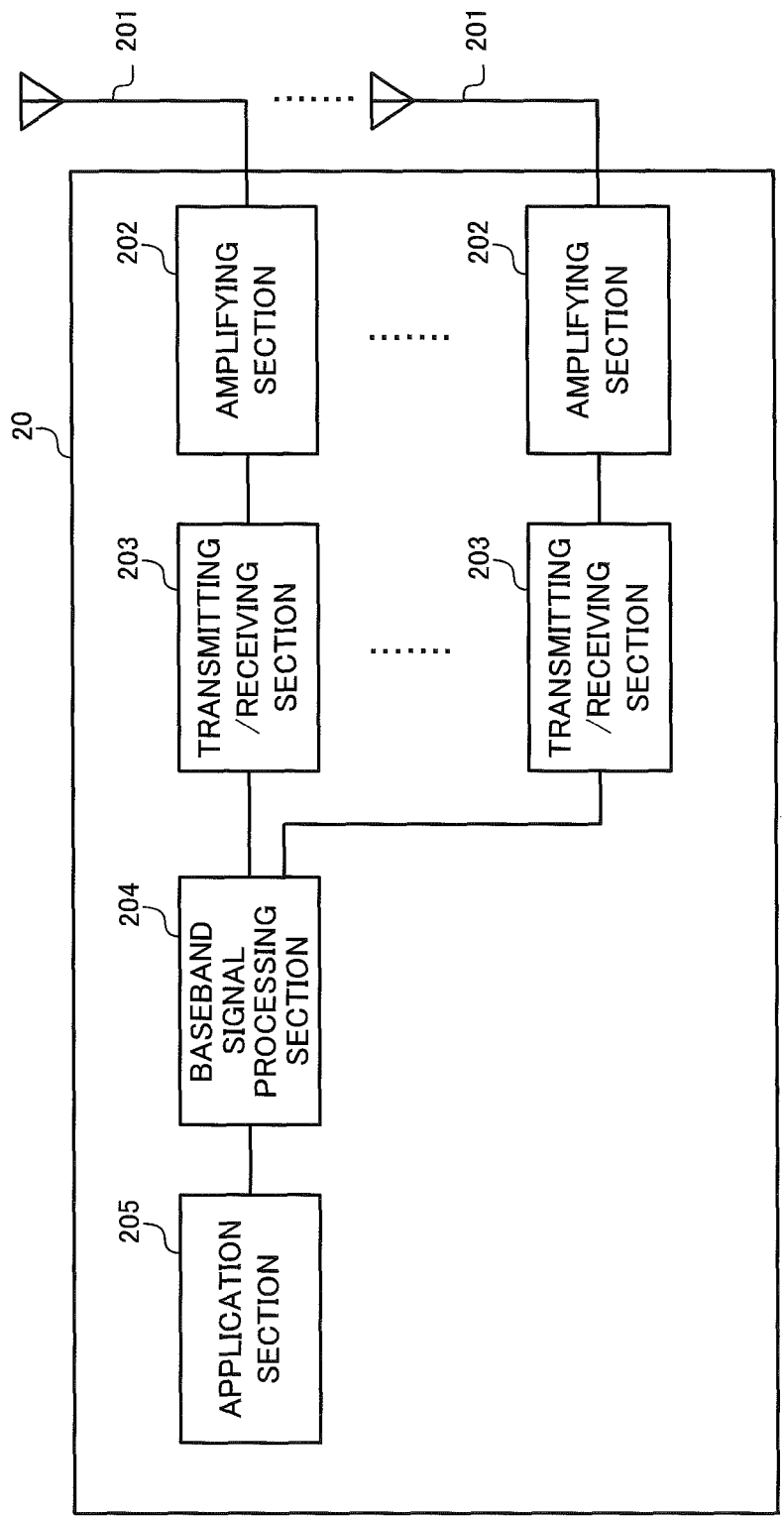
FIG. 16 is a block diagram to show an example structure of a user terminal.

FIG. 16 is a block diagram to show an example structure of a user terminal according to the present embodiment. A user terminal 20 has a plurality of transmitting/receiving antennas 201, amplifying sections 202, transmitting/receiving section 203, a baseband signal processing section 204 and an application section 205.

Downlink data is received in a plurality of transmitting/receiving antennas 201 and input in the amplifying sections 202. The radio frequency signals input from each transmitting/receiving antenna 201 are amplified in the amplifying sections 202 and sent to each transmitting/receiving section 203. The amplified radio frequency signals are converted into baseband signals in each transmitting/receiving section 203, and input in the baseband signal processing section 204. In the baseband signal processing section 204, the baseband signals that are input are subjected to an FFT process, error correction decoding, a retransmission control receiving process and so on. User data that is included in the downlink data is transferred to the application section 205. The application section 205 performs processes related to higher layers above the physical layer and the MAC layer. Also, the broadcast information that is included in the downlink data is also transferred to the application section 205.

Uplink user data is input from the application section 205 to the baseband signal processing section 204. In the baseband signal processing section 204, the user data that is input is subjected to a retransmission control (H-ARQ (Hybrid ARQ)) transmission process, channel coding, precoding, a discrete Fourier transform (DFT) process, an IFFT process and so on, and then transferred to each transmitting/receiving section 203. Baseband signals that are output from the baseband signal processing section 204 are converted into a radio frequency band in the transmitting/receiving sections 203. After that, the radio frequency signals having been subjected to frequency conversion are amplified in the amplifying sections 202 and transmitted from the transmitting/receiving antennas 201.

Figure 17:
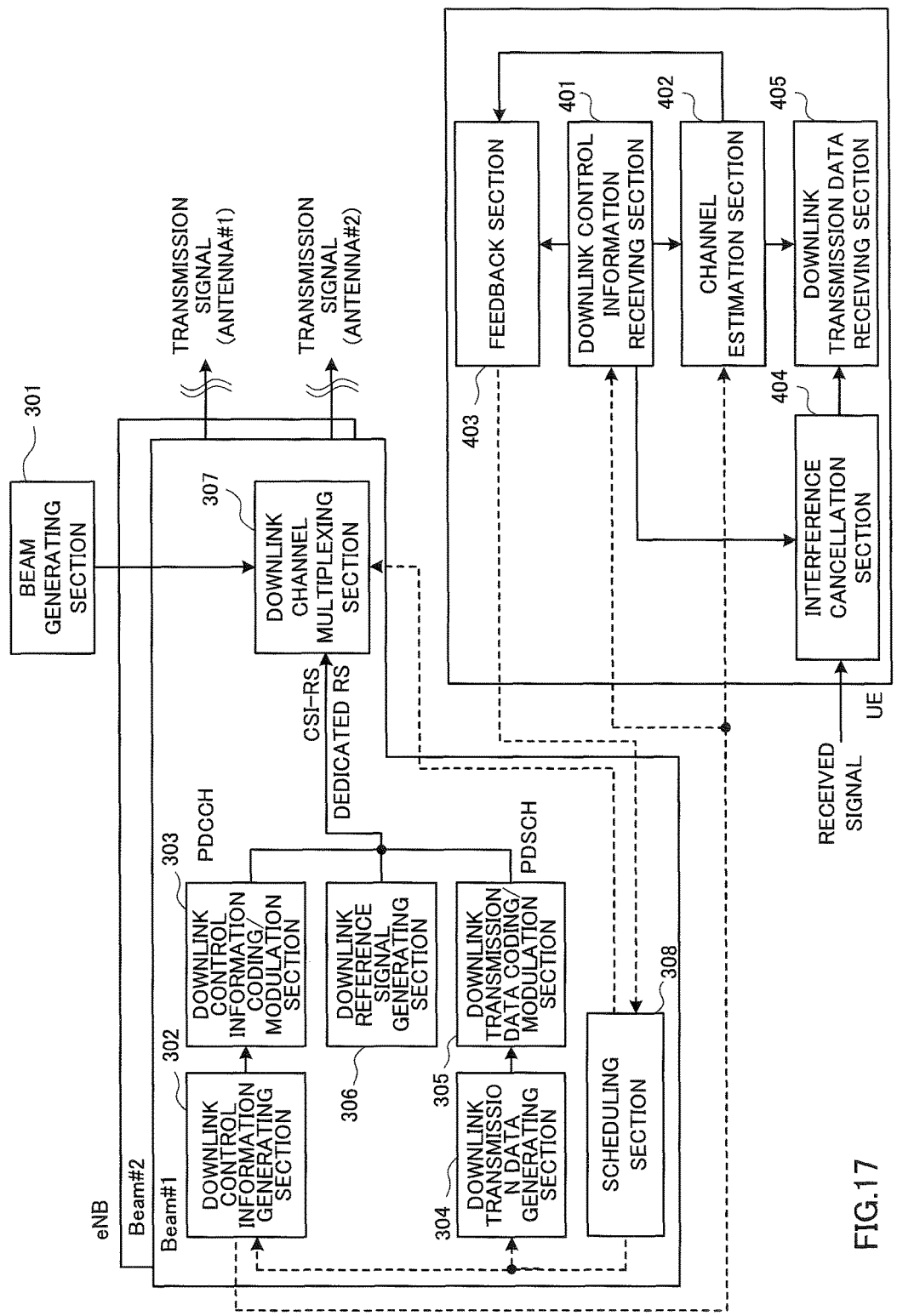
FIG. 17 is a block diagram to show example structures of baseband signal processing sections provided in a radio base station and a user terminal.

FIG. 17 is a block diagram to show example structures of the baseband signal processing sections provided in the radio base stations and user terminals according to the present embodiment. Note that, although FIG. 17 shows only part of the structures, the radio base station 10 and the user terminal 20 have components that are required, without shortage.

As shown in FIG. 17, the radio base station 10 has a beam generating section 301, a downlink control information generating section 302, a downlink control information coding/modulation section 303, a downlink transmission data generating section 304, a downlink transmission data coding/modulation section 305, a downlink reference signal generating section 306, a downlink channel multiplexing section 307 and a scheduling section 308.

The beam generating section 301 generates a plurality of transmission beams that are orthogonal to each other by using radio resources (frequency band, time slots, etc.) of predetermined patterns or random patterns.

The downlink control information generating section 302 generates user terminal-specific (UE-specific) downlink control information (DCI) to be transmitted in the PDCCH. The user terminal-specific downlink control information includes DL assignments, which are PDSCH allocation information, UL grants, which are PUSCH allocation information, and so on. When the first example is employed, this downlink control information includes control information to request a feedback of CQIs (or CSI) to each user terminal 20. Also, when the second example is employed, this downlink control information includes control information to request a feedback of coarse CSI and control information to request a feedback of accurate CSI, to each user terminal 20.

The downlink control information that is generated in the downlink control information generating section 302 is input in the downlink control information coding/modulation section 303, with shared control information that is common between the user terminals, as downlink control information to be transmitted in the PDCCH. The downlink control information coding/modulation section 303 performs channel coding and modulation of the downlink control information that is input. The modulated downlink control information is output to the downlink channel multiplexing section 307.

The downlink transmission data generating section 304 generates downlink user data on a per user terminal 20 basis. The downlink user data that is generated in the downlink transmission data generating section 304 is input in the downlink transmission data coding/modulation section 305, with higher control information, as downlink transmission data to be transmitted in the PDSCH. The downlink transmission data coding/modulation section 305 performs channel coding and modulation of the downlink transmission data for each user terminal 20. The modulated downlink transmission data is output to the downlink channel multiplexing section 307.

The downlink reference signal generating section 306 generates downlink reference signals (CRSs (Cell-specific Reference Signals), CSI-RSs, DM-RSs and so on). The generated downlink reference signals are output to the downlink channel multiplexing section 307. Note that, for example, CSI-RSs that are specific to each transmission beam are used to measure CQIs (or CSI).

The downlink channel multiplexing section 307 combines the downlink control information, the downlink reference signals and the downlink transmission data (including higher control information) and generates downlink signals (transmission signals). To be more specific, the downlink channel multiplexing section 307 non-orthogonal-multiplexes downlink signals, on a per transmission beam basis, for a plurality of user terminals 20 that are determined in the scheduling section 308, in accordance with scheduling information reported from the scheduling section 308. The downlink signals generated in the downlink channel multiplexing section 307 undergo an inverse fast Fourier transform process, a precoding process and so on, and transferred to the transmitting/receiving sections 103.

The scheduling section 308 generates scheduling information for commanding allocation of radio resources to the downlink transmission data and the downlink control information, based on command information from the higher station apparatus 30 and CSI (CQIs (Channel Quality Indicators), RIs (Rank Indicators) and so on) from each user terminal 20. Also, the scheduling section 308 determines a plurality of user terminals UE to non-orthogonal-multiplex, per transmission beam, based on the CQIs (or CSI) that are fed back. For example, when the first example is applied, the scheduling section 308 schedules each transmission beam and determines the user terminals 20 to non-orthogonal-multiplex, based on the CQIs (or CSI) fed back from the user terminals 20. When the second example is applied, the scheduling section 308 selects a plurality of user terminals 20 to make feed back accurate CSI based on coarse CSI that is fed back. Also, the scheduling section 308 schedules each transmission beam and determines the user terminals 20 to non-orthogonal-multiplex based on the accurate CSI that is fed back.

In this radio base station 10, beam vectors (precoders) of the transmission beams to be used in data transmission are determined in the beam generating section 301. The transmission beam-specific downlink reference signals (for example, CSI-RSs) that are generated in the downlink reference signal generating section 306 are transmitted to the user terminals 20 in the transmission beams corresponding to each beam vector. When the first example is applied, control information to request a feedback of CQIs (or CSI) is generated in the downlink control information generating section 302, and transmitted to all the user terminals 20. When the second example is applied, control information to request a feedback of coarse CSI is generated in the downlink control information generating section 302, and transmitted to all the user terminals 20.

When the first example is applied and CQIs (or CSI) are fed back from each user terminal 20, the scheduling section 308 schedule each transmission beam and determines the user terminals 20 to non-orthogonal-multiplex based on the CQIs fed back. Also, the downlink channel multiplexing section 307 non-orthogonal-multiplexes downlink signals, per transmission beam, for a plurality of user terminals 20 determined in the scheduling section 308, in accordance with scheduling information that is reported from the scheduling section 308. Also, the radio base station 10 reports, to each user terminal 20, information related to the other user terminals 20 that are non-orthogonal-multiplexed in the same transmission beam.

When the second example is applied, the scheduling section 308 selects a plurality of user terminal 20 to make feed back accurate CSI based on coarse CSI that is fed back. Also, control information to request a feedback of accurate CSI is generated in the downlink control information generating section 302, and transmitted to the selected user terminals 20. After that, the scheduling section 308 schedule each transmission beam based on the accurate CSI that is fed back, and determines the user terminals 20 to non-orthogonal-multiplex. Also, the downlink channel multiplexing section 307 non-orthogonal-multiplexes downlink signals, per transmission beam, for a plurality of user terminals 20 that are determined in the scheduling section 308, in accordance with scheduling information that is reported from the scheduling section 308. Also, the radio base station 10 reports, to each user terminal 20, information related to other user terminals 20 that are non-orthogonal-multiplexed in the same transmission beam.

As shown in FIG. 17, a user terminal 20 has a downlink control information receiving section 401, a channel estimation section 402, a feedback section 403, an interference cancelation section 404 and a downlink transmission data receiving section 405.

A downlink signal that is sent out from the radio base station 10 is received in the transmitting/receiving antennas 201, undergoes removal of the cyclic prefixes, a fast Fourier transform process and so on, and then transferred to the baseband signal processing section 204. The downlink signal is separated into the downlink control information, the downlink transmission data (including higher control information), and the downlink reference signals, in the baseband signal processing section 204. The downlink control information is input in the downlink control information receiving section 401, the downlink transmission data is input in the downlink transmission data receiving section 405, and the downlink reference signals are input in the channel estimation section 402.

In the downlink control information receiving section 401, the downlink control information is demodulated and output to the channel estimation section 402, the feedback section 403, the interference cancelation section 404 and so on. When the first example is applied, when a CQI (or CSI) feedback request is received via the downlink control information, the channel estimation section 402 performs channel estimation based on the transmission beam-specific downlink reference signals (CSI-RSs and so on), and measures CQIs (or CSI). The CQIs (or CSI) that are acquired in the channel estimation are fed back to the radio base station 10 through the feedback section 403.

When the second example is applied, when a request for a feedback of coarse CSI is received via the downlink control information, the channel estimation section 402 performs channel estimation based on transmission beam-specific downlink reference signals, and measures coarse CSI. Also, when a request for a feedback of accurate CSI is received via the downlink control information, the channel estimation section 402 performs channel estimation based on transmission beam-specific downlink reference signals and measures accurate CSI. The coarse CSI and accurate CSI acquired by channel estimation are fed back to the radio base station 10 through the feedback section 403.

The interference cancelation section 404 cancels the interference between the transmission beams by using a linear filter. Also, the interference cancelation section 404 cancels the interference by signals for other user terminals 20, from the downlink signals for a plurality of user terminals 20 that are non-orthogonal-multiplexed per transmission beam. To be more specific, based on information of the subject terminal and other user terminals 20 that is reported via higher control information and so on, the interference cancelation section 404 separates the downlink signals for the subject terminal by canceling the downlink signals for the other user terminals 20 that are non-orthogonal-multiplexed. The downlink transmission data receiving section 405 demodulates the downlink transmission data based on the separated downlink signals for the subject terminal.

In this user terminal 20, when the first example is applied and the downlink control information receiving section 401 receives a CQI (or CSI) feedback request, the channel estimation section 402 calculates CQIs (or CSI) based on the downlink reference signals transmitted in each transmission beam. The calculated CQIs (or CSI) are fed back to the radio base station 10 via the feedback section 403.

When the second example is applied and the downlink control information receiving section 401 receives a request for a feedback of coarse CSI, the channel estimation section 402 calculates coarse CSI based on the downlink reference signals transmitted in each transmission beam. The calculated coarse CSI is fed back to the radio base station 10 via the feedback section 403. Also, when the downlink control information receiving section 401 receives a request for a feedback of accurate CSI, the channel estimation section 402 calculates accurate CSI based on the downlink reference signals transmitted in each transmission beam. The calculated accurate CSI is fed back to the radio base station 10 via the feedback section 403.

The user terminal 20 acquires information for the subject terminal and information for the other user terminals 20 through, for example, higher control information. To be more specific, the user terminal 20 acquires information to show the interference between the transmission beams, and information related to the other non-orthogonal-multiplexed user terminals 20. Based on these pieces of information, the interference cancelation section 404 cancels the interference between the transmission beams by using a linear filter such as MMSE and IRC, and cancels the interference by signals for the other user terminals that are non-orthogonal-multiplexed in the same transmission beam. SIC is employed to cancel signals for user terminals UE where the condition of the transmission path is poorer (the received SINR is lower or the path loss is greater) than at the subject terminal. After having canceled the interference by signals for the other user terminals UE, the downlink transmission data receiving section 405 demodulates the downlink transmission data for the subject terminal.

As described above, with the radio communication system 1 according to the present embodiment, non-orthogonal multiplexing is applied to opportunistic beamforming that can achieve equivalent system characteristics to MIMO transmission, so that it is possible to improve the throughput and system capacity even more.

The present invention can be implemented with various corrections and in various modifications, without departing from the spirit and scope of the present invention. That is to say, the descriptions herein are provided only for the purpose of illustrating examples, and should by no means be construed to limit the present invention in any way.

The disclosure of Japanese Patent Application No. 2012-288166, filed on Dec. 28, 2012, including the specification, drawings and abstract, is incorporated herein by reference in its entirety.

The invention claimed is:

1. A user terminal comprising:
 a receiver that receives:
   a signal subjected to multiplexing in a power dimension of a given layer based on one or more transmitting antennas; and
   an information indicating application of the multiplexing in the power dimension of the given layer or one of the transmitting antennas,
   wherein the information indicating application of multiplexing in the power dimension comprises an interference presence information; and
 a processor coupled to a memory, the processor:
   determines a radio resource of an interfering signal in the multiplexed signal to be the same as a radio resource of a signal for the user terminal based on the interference presence information; and
   demodulates the signal for the user terminal from the multiplexed signal based on the information indicating application of the multiplexing in the power direction and the interference presence information.

2. The user terminal according to claim 1, wherein the information indicating application of the multiplexing in the power dimension represents a ratio of different transmission powers used in the multiplexing in the power dimension.

3. The user terminal according to claim 2, wherein a reference signal included in the multiplexed signal has a reference signal structure that is common to user terminals.

4. The user terminal according to claim 2, wherein a reference signal included in the multiplexed signal is a cell-specific reference signal (CRS).

5. The user terminal according to claim 2, wherein the multiplexed signal is further orthogonal-multiplexed in the given layer.

6. The user terminal according to claim 1, wherein a reference signal included in the multiplexed signal has a reference signal structure that is common to user terminals.

7. The user terminal according to claim 6, wherein the reference signal is specific to the given layer.

8. The user terminal according to claim 7, wherein the reference signal is orthogonal to a reference signal included in a signal that is multiplexed in the power dimension in a different layer from the given layer.

9. The user terminal according to claim 6, wherein the reference signal is orthogonal to a reference signal included in a signal that is multiplexed in the power dimension in a different layer from the given layer.

10. A radio base station that communicates with a user terminal, comprising:
a processor coupled to a memory, the processor:
multiplexes a signal in a power dimension of a given layer based on one or more transmitting antennas;
generates information indicating application of multiplexing in the power dimension of the given layer or one of the transmitting antennas,
wherein the information indicating application of multiplexing in the power dimension comprises an interference presence information; and
a transmitter that transmits the multiplexed signal and transmits the information indicating application of the multiplexing in the power dimension to the user terminal for demodulation,
wherein the interference presence information further indicates to the user terminal a same radio resource corresponding to the signal and an interfering signal.

11. The user terminal according to claim 6, wherein the reference signal is a channel state information reference signal (CSI-RS) or a demodulation reference signal (DM-RS).

12. The user terminal according to claim 1, wherein a reference signal included in the multiplexed signal is a cell-specific reference signal (CRS).

13. The user terminal according to claim 1, wherein the multiplexed signal is further orthogonal-multiplexed in the given layer.

14. The radio base station according to claim 10, wherein the processor orthogonal-multiplexes the multiplexed signal.

15. A radio communication method for a user terminal comprising:
receiving a signal subjected to multiplexing in a power dimension in a given layer based on one or more transmitting antennas and receiving information indicating application of the multiplexing in the power dimension of the given layer and the one or more transmitting antennas,
wherein the information indicating application of multiplexing in the power dimension comprises an interference presence information;
determining a radio resource of an interfering signal in the multiplexed signal to be the same as a radio resource of a signal for the user terminal based on the interference presence information; and
demodulating a signal for the user terminal from the multiplexed signal based on the information indicating application of the multiplexing in the power dimension and the interference presence information.

* * * * *